United States Patent
Canberk et al.

(10) Patent No.: US 11,269,402 B1
(45) Date of Patent: Mar. 8, 2022

(54) USER INTERFACE INTERACTION PARADIGMS FOR EYEWEAR DEVICE WITH LIMITED FIELD OF VIEW

(71) Applicants: Ilteris Canberk, Venice, CA (US); David Meisenholder, Los Angeles, CA (US); Jonathan M. Rodriguez, II, Beverly Hills, CA (US)

(72) Inventors: Ilteris Canberk, Venice, CA (US); David Meisenholder, Los Angeles, CA (US); Jonathan M. Rodriguez, II, Beverly Hills, CA (US)

(73) Assignee: Snap Inc., Santa Monica, CA (US)

( * ) Notice: Subject to any disclaimer, the term of this patent is extended or adjusted under 35 U.S.C. 154(b) by 93 days.

(21) Appl. No.: 16/525,785

(22) Filed: Jul. 30, 2019

Related U.S. Application Data

(60) Provisional application No. 62/714,239, filed on Aug. 3, 2018.

(51) Int. Cl.
| | |
|---|---|
| *G09G 5/37* | (2006.01) |
| *G06F 3/01* | (2006.01) |
| *G02C 9/00* | (2006.01) |
| *G06F 3/04815* | (2022.01) |

(52) U.S. Cl.
CPC ............... *G06F 3/012* (2013.01); *G02C 9/00* (2013.01); *G06F 3/013* (2013.01); *G06F 3/04815* (2013.01); *G09G 5/37* (2013.01); *G06F 2203/04804* (2013.01); *G09G 2354/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,822,117 | A * | 10/1998 | Kleinberger | H04N 13/376 359/465 |
| 9,727,790 | B1 * | 8/2017 | Vaziri | G06F 3/012 |
| 2011/0213664 | A1 * | 9/2011 | Osterhout | G06F 3/013 705/14.58 |
| 2012/0294478 | A1 * | 11/2012 | Publicover | G02B 27/0093 382/103 |
| 2015/0015686 | A1 * | 1/2015 | de la Barre | H04N 13/351 348/59 |

(Continued)

*Primary Examiner* — Temesghen Ghebretinsae
*Assistant Examiner* — Sosina Abebe
(74) *Attorney, Agent, or Firm* — Culhane Meadows PLLC; Stephen J. Weed

(57) ABSTRACT

An eyewear device presents, via an image display, an initial displayed image. The initial displayed image has an initial field of view corresponding to an initial head direction or an initial eye direction. Eyewear device detects movement of a user of the eyewear device by: (i) tracking, via a head movement tracker, a head movement of a head of the user, or (ii) tracking, via an eye movement tracker, an eye movement of an eye of the user of the eyewear device. Eyewear device determines a field of view adjustment to the initial field of view of the initial displayed image based on the detected movement of the user. Field of view adjustment includes a successive field of view corresponding to a successive head direction or a successive eye direction. Eyewear device generates a successive displayed image based on the field of view adjustment and presents the successive displayed image.

21 Claims, 28 Drawing Sheets

(56) References Cited

U.S. PATENT DOCUMENTS

| | | | |
|---|---|---|---|
| 2016/0035140 A1* | 2/2016 | Bickerstaff | G06T 19/006 345/633 |
| 2016/0167672 A1* | 6/2016 | Krueger | A61B 5/7282 340/576 |
| 2017/0309005 A1* | 10/2017 | Korzunov | G06T 19/20 |
| 2018/0061103 A1* | 3/2018 | Zhu | G06F 3/012 |
| 2018/0348861 A1* | 12/2018 | Uscinski | G06F 3/011 |

* cited by examiner

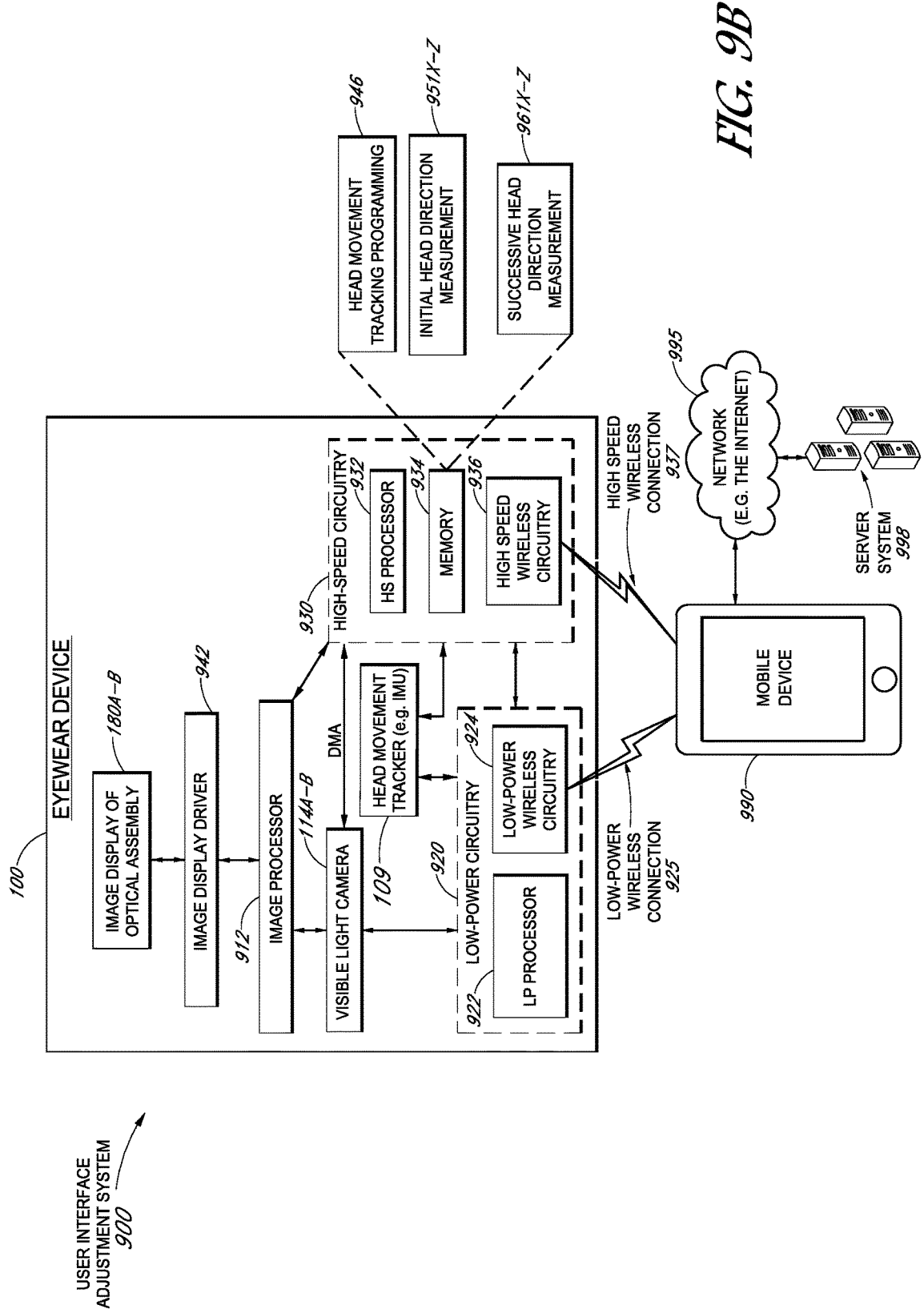

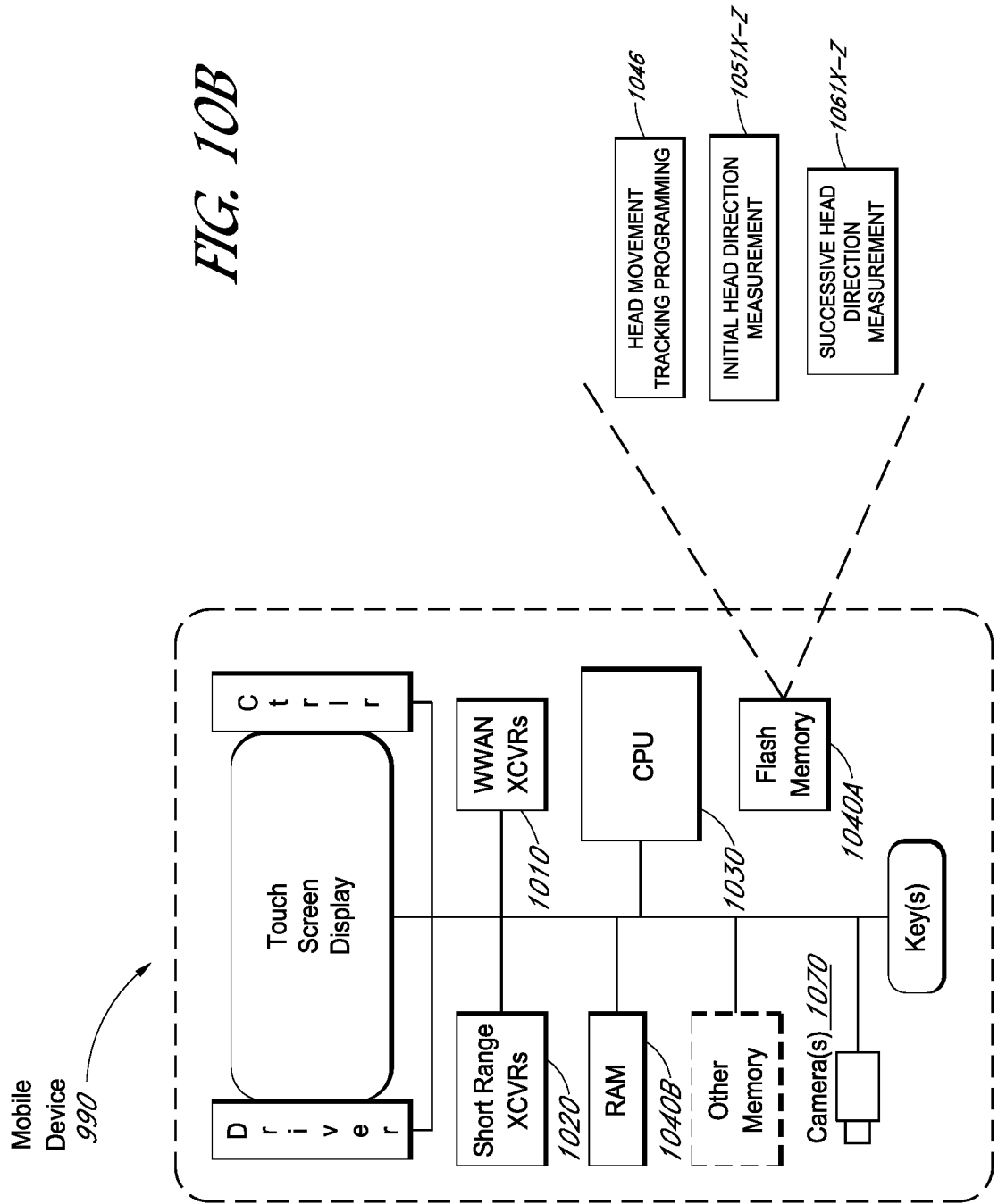

USER INTERFACE INTERACTION PARADIGMS FOR EYEWEAR DEVICE WITH LIMITED FIELD OF VIEW

CROSS-REFERENCE TO RELATED APPLICATION

This application claims priority to U.S. Provisional Application Ser. No. 62/714,239 entitled USER INTERFACE INTERACTION PARADIGMS FOR EYEWEAR DEVICE WITH LIMITED FIELD OF VIEW, filed on Aug. 3, 2018, the contents of which are incorporated fully herein by reference.

TECHNICAL FIELD

The present subject matter relates to wearable devices, e.g., eyewear devices, with a limited field of view and adjustments to a user interface based on head or eye movement by a user.

BACKGROUND

Wearable devices, including portable eyewear devices, such as smartglasses, headwear, and headgear, available today integrate image displays and cameras. Viewing and interacting with the displayed content on the devices can be difficult due to the small image display area available on the wearable device. For example, size limitations and the form factor of the image display of a wearable eyewear device can make navigation difficult to incorporate into the devices.

A graphical user interface (GUI) is a type of user interface that allows users to interact with an electronic device through graphical icons and visual indicators such as secondary notation, instead of a text-based user interfaces, typed command labels, or text navigation. However, the available area for placement of graphical user interface elements on the image display of the eyewear device is limited. Due to the small form factor of the eyewear device, viewing, manipulating, and interacting with displayed content on the image display is cumbersome. For example, finding a displayed object can require multiple swipes, taps, and other finger gestures. Accordingly, a need exists to simplify user interactions with eyewear devices.

BRIEF DESCRIPTION OF THE DRAWINGS

The drawing figures depict one or more implementations, by way of example only, not by way of limitations. In the figures, like reference numerals refer to the same or similar elements.

FIG. 9B is a high-level functional block diagram of an example user interface field of view adjustment system, which is very similar to FIG. 9A, but utilizes the head movement tracker instead of the eye movement tracker.

FIG. 10B shows an example of a hardware configuration for the mobile device of the user interface field of view adjustment system of FIG. 9B, based on detected head movement, in simplified block diagram form.

DETAILED DESCRIPTION

Figure 1A:
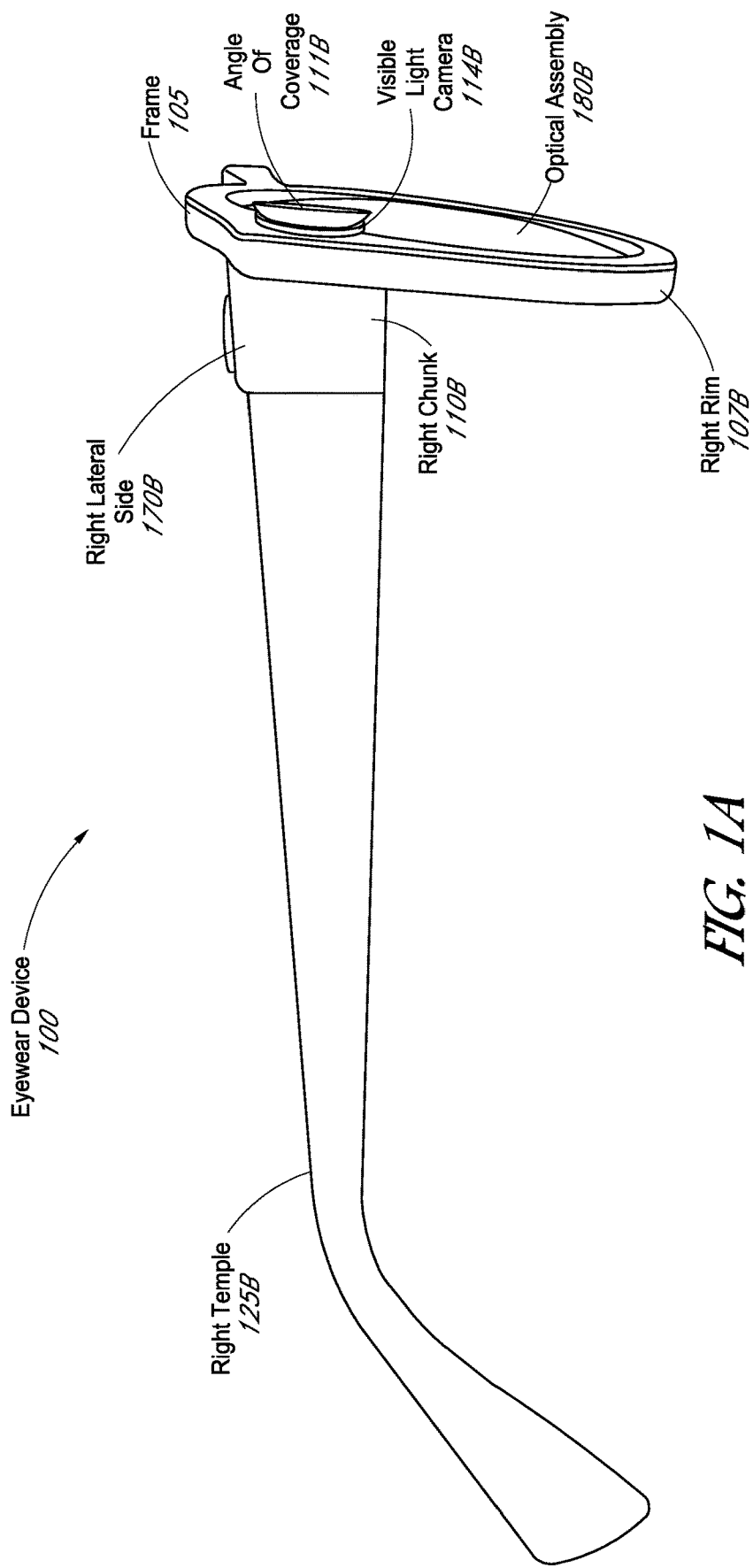
FIG. 1A is a side view of an example hardware configuration of an eyewear device, which shows a right optical assembly with an image display, and field of view adjustments are applied to a user interface presented on the image display based on detected head or eye movement by a user.

In the following detailed description, numerous specific details are set forth by way of examples in order to provide a thorough understanding of the relevant teachings. However, it should be apparent to those skilled in the art that the present teachings may be practiced without such details. In other instances, description of well-known methods, procedures, components, and circuitry are set forth at a relatively high-level, without detail, in order to avoid unnecessarily obscuring aspects of the present teachings.

The term "coupled" or "connected" as used herein refers to any logical, optical, physical or electrical connection, link or the like by which electrical or magnetic signals produced or supplied by one system element are imparted to another coupled or connected element. Unless described otherwise, coupled or connected elements or devices are not necessarily directly connected to one another and may be separated by intermediate components, elements or communication media that may modify, manipulate or carry the electrical signals. The term "on" means directly supported by an element or indirectly supported by the element through another element integrated into or supported by the element.

The orientations of the eyewear device, associated components and any complete devices incorporating a head movement tracker or an eye movement tracker such as shown in any of the drawings, are given by way of example only, for illustration and discussion purposes. In operation for determining field of view adjustments, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom, side, horizontal, vertical, and diagonal are used by way of example only, and are not limiting as to direction or orientation of any head movement tracker or eye movement tracker or component of the head movement tracker of the eye movement tracker constructed as otherwise described herein.

To overcome the problem of the small field of view in head mounted image displays on an eyewear device, adjustments to the user interface presented on the image display can be based on head or eye movement measurements from the user wearing the eyewear device. As further described herein, head or eye movement measurements can be taken (e.g., using an IMU or a camera). The sequential images presented on the image display are then adjusted according to the detected head or eye movement.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below. FIG. 1A is a side view of an example hardware configuration of an eyewear device 100, which includes a right optical assembly 180B with an image display, that provides visual area adjustments to a user interface presented on the image display based on detected head or eye movement by a user. Eyewear device 100 includes multiple visible light cameras 114A-B that form a stereo camera, of which the right visible light camera 114B is located on a right chunk 110B.

In the example of FIG. 1A, the left and right visible light cameras 114A-B are sensitive to the visible light range wavelength. Each of the visible light cameras 114A-B has a different frontward facing angle of coverage, for example, visible light camera 114B has the depicted angle of coverage 111B. The angle of coverage is an angle range in which the image sensor of the visible light camera 114A-B picks up electromagnetic radiation and generate images. Examples of such visible light cameras 114A-B include a high-resolution complementary metal-oxide-semiconductor (CMOS) image sensor and a video graphic array (VGA) camera, such as 640p (e.g., 640×480 pixels for a total of 0.3 megapixels), 720p, or 1080p. Image sensor data from the visible light cameras 114A-B are captured along with geolocation data, digitized by an image processor, and stored in a memory.

To provide stereoscopic vision, visible light cameras 114A-B may be coupled to an image processor (element 912 of FIGS. 9A-B) for digital processing along with a timestamp in which the image of the scene is captured. Image processor 912 includes circuitry to receive signals from the visible light camera 114A-B and to process those signals from the visible light camera 114A-B into a format suitable for storage in the memory. The timestamp can be added by the image processor or other processor, which controls operation of the visible light cameras 114A-B. Visible light cameras 114A-B allow the stereo camera to simulate human binocular vision. The stereo camera provides the ability to reproduce three-dimensional images based on two captured images from the visible light cameras 114A-B having the same timestamp. Such three-dimensional images allow for an immersive life-like experience, e.g., for virtual reality or video gaming. For stereoscopic vision, a pair of images is generated at a given moment in time—one image for each of the left and right visible light cameras 114A-B. When the pair of generated images from the frontward facing angles of coverage 111A-B of the left and right visible light cameras 114A-B are stitched together (e.g., by the image processor), depth perception is provided by the optical assembly 180A-B.

In an example, a user interface field of view adjustment system includes the eyewear device 100. The eyewear device 100 includes a frame 105, a right temple 125B extending from a right lateral side 170B of the frame 105, and an image display (e.g., optical assembly 180A-B) to present a graphical user interface to a user. The eyewear device 100 includes a left visible light camera 114A connected to the frame 105 or the left temple 125A to capture a first image of the scene. Eyewear device 100 further includes a right visible light camera 114B connected to the frame 105 or the right temple 125B to capture (e.g., simultaneously with the left visible light camera 114A) a second image of the scene which partially overlaps the first image. Although not shown in FIGS. 1A-B, the user interface field of view adjustment system further includes a processor (element 932 of FIGS. 9A-B) coupled to the eyewear device 100 and connected to the visible light cameras 114A-B, a memory (element 934 of FIGS. 9A-B) accessible to the processor 932, and programming in the memory (element 934 of FIGS. 9A-B), for example in the eyewear device 100 itself or another part of the user interface field of view adjustment system.

Figure 1B:
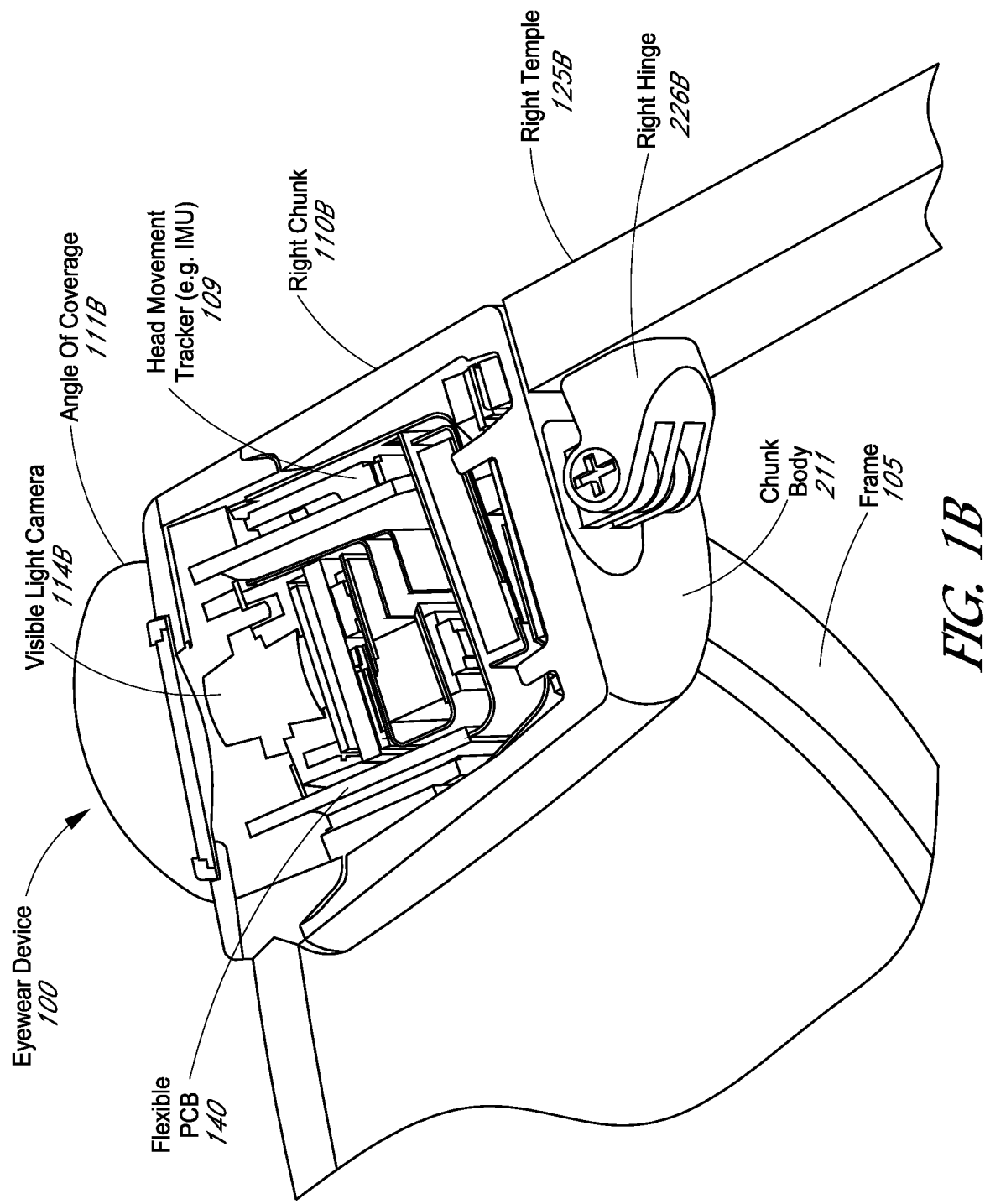
FIG. 1B is a top cross-sectional view of a chunk of the eyewear device of FIG. 1A depicting a visible light camera, a head movement tracker for tracking the head movement of the user of the eyewear device, and a circuit board.
Figure 2A:
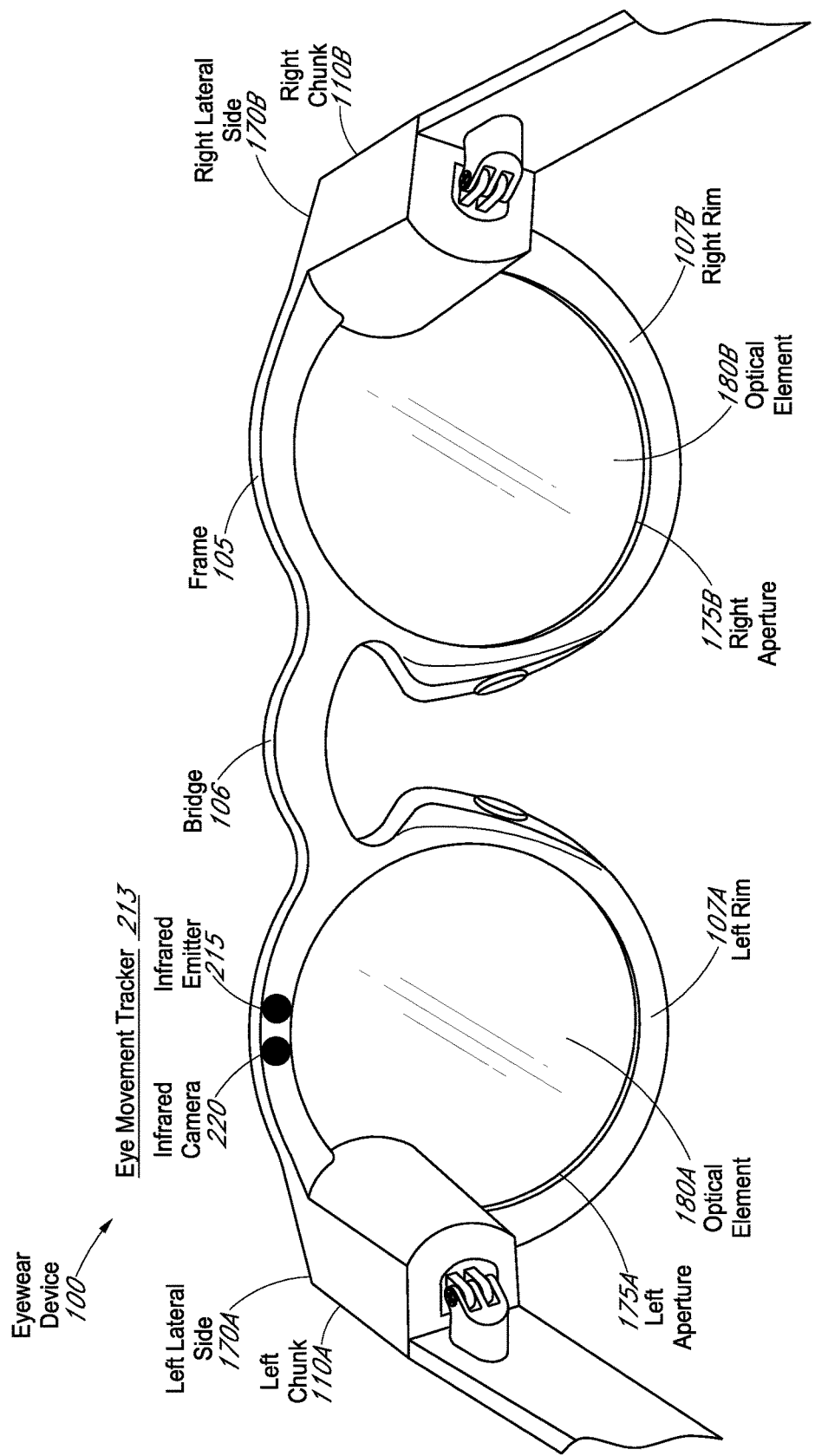
FIG. 2A is a rear view of an example hardware configuration of an eyewear device, which includes an eye movement tracker on a frame, for tracking the eye movement of the user of the eyewear device.
Figure 2B:
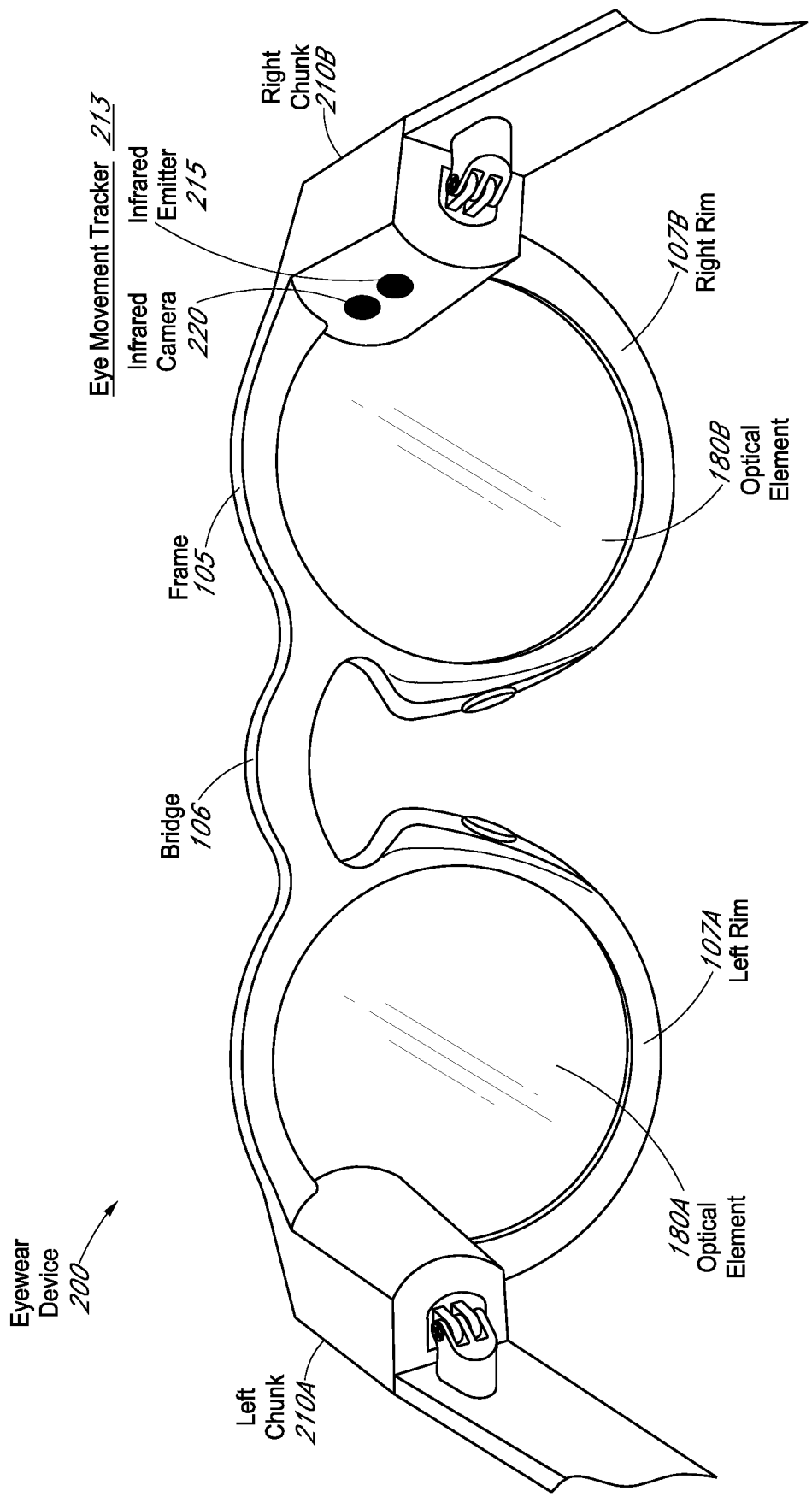
FIG. 2B is a rear view of an example hardware configuration of an eyewear device, which includes an eye movement tracker on a chunk, for tracking the eye movement of the user of the eyewear device.

Although not shown in FIG. 1A, the eyewear device 100 also includes a head movement tracker (element 109 of FIG. 1B) or an eye movement tracker (element 213 of FIGS. 2A-B). Eyewear device 100 further includes the image display of optical assembly 180A-B for presenting a sequence of displayed images and an image display driver (element 942 of FIGS. 9A-B) coupled to the image display of optical assembly 180A-B to control the image display of optical assembly 180A-B to present the sequence of displayed images, which are described in further detail below. Eyewear device 100 further includes a memory (element 934 of FIGS. 9A-B) and a processor (element 932 of FIGS. 9A-B) having access to the image display driver (element 942 of FIGS. 9A-B) and the memory (element 934 of FIGS. 9A-B). Eyewear device 100 further includes programming (element 934 of FIGS. 9A-B) in the memory. Execution of the programming by the processor (element 932 of FIGS. 9A-B) configures the eyewear device 100 to perform functions, including functions to present, via the image display 942, an initial displayed image of the sequence of displayed images, the initial displayed image having an initial field of view corresponding to an initial head direction or an initial eye direction (e.g., eye gaze direction). Examples of initial displayed images 1405A, 1505A, and 1605A are shown in FIGS. 14A, 15A, and 16A.

Execution of the programming by the processor (element 932 of FIGS. 9A-B) further configures the eyewear device 100 to detect movement of a user of the eyewear device by: (i) tracking, via the head movement tracker (element 109 of FIG. 1B), a head movement of a head of the user, or (ii) tracking, via the eye movement tracker (element 213 of FIGS. 2A-B), an eye movement of an eye of the user of the eyewear device 100. Execution of the programming by the processor (element 932 of FIGS. 9A-B) further configures the eyewear device 100 to determine a field of view adjustment to the initial field of view of the initial displayed image based on the detected movement of the user. The field of view adjustment includes a successive field of view corresponding to a successive head direction or a successive eye direction. Execution of the programming by the processor (element 932 of FIGS. 9A-B) further configures the eyewear device 100 to generate a successive displayed image of the sequence of displayed images based on the field of view adjustment. Execution of the programming by the processor (element 932 of FIGS. 9A-B) further configures the eyewear device 100 to present, via the image display of the optical assembly 180A-B, the successive displayed image. Examples of successive displayed images 1405B, 1505B, and 1605B are shown in FIGS. 14A, 15A, and 16A based on field of view adjustments 1410, 1510, and 1610.

FIG. 1B is a top cross-sectional view of the chunk of the eyewear device 100 of FIG. 1A depicting the right visible light camera 114B, a head movement tracker 109, and a circuit board. Construction and placement of the left visible light camera 114A is substantially similar to the right visible light camera 114B, except the connections and coupling are on the left lateral side 170A. As shown, the eyewear device 100 includes the right visible light camera 114B and a circuit board, which may be a flexible printed circuit board (PCB) 140. The right hinge 226B connects the right chunk 110B to a right temple 125B of the eyewear device 100. In some examples, components of the right visible light camera 114B, the flexible PCB 140, or other electrical connectors or contacts may be located on the right temple 125B or the right hinge 226B.

As shown, eyewear device 100 has a head movement tracker 109, which includes, for example, an inertial measurement unit (IMU). An inertial measurement unit is an electronic device that measures and reports a body's specific force, angular rate, and sometimes the magnetic field surrounding the body, using a combination of accelerometers and gyroscopes, sometimes also magnetometers. The inertial measurement unit works by detecting linear acceleration using one or more accelerometers and rotational rate using one or more gyroscopes. Typical configurations of inertial measurement units contain one accelerometer, gyro, and magnetometer per axis for each of the three axes: horizontal axis for left-right movement (X), vertical axis (Y) for top-bottom movement, and depth or distance axis for up-down movement (Z). The gyroscope detects the gravity vector. The magnetometer defines the rotation in the magnetic field (e.g., facing south, north, etc.) like a compass which generates a heading reference. The three accelerometers to detect acceleration along the horizontal, vertical, and depth axis defined above, which can be defined relative to the ground, the eyewear device 100, or the user wearing the eyewear device 100.

Eyewear device 100 detects movement of the user of the eyewear device 100 by tracking, via the head movement tracker 109, the head movement of the head of the user. The head movement includes a variation of head direction on a horizontal axis, a vertical axis, or a combination thereof from the initial head direction during presentation of the initial displayed image on the image display. In one example, tracking, via the head movement tracker 109, the head movement of the head of the user includes measuring, via the inertial measurement unit 109, the initial head direction on the horizontal axis (e.g., X axis), the vertical axis (e.g., Y axis), or the combination thereof (e.g., transverse or diagonal movement). Tracking, via the head movement tracker 109, the head movement of the head of the user further includes measuring, via the inertial measurement unit 109, a successive head direction on the horizontal axis, the vertical axis, or the combination thereof during presentation of the initial displayed image.

Tracking, via the head movement tracker 109, the head movement of the head of the user further includes determining the variation of head direction based on both the initial head direction and the successive head direction. Detecting movement of the user of the eyewear device 100 further includes in response to tracking, via the head movement tracker 109, the head movement of the head of the user, determining that the variation of head direction exceeds a deviation angle threshold on the horizontal axis, the vertical axis, or the combination thereof. The deviation angle threshold is between about 3° to 10°. As used herein, the term "about" when referring to an angle means±10% from the stated amount.

Variation along the horizontal axis slides three-dimensional objects, such as characters, bitmojis, application icons, etc. in and out of the field of view by, for example, hiding, unhiding, or otherwise adjusting visibility of the three-dimensional object. Variation along the vertical axis, for example, when the user looks upwards, in one example, displays weather information, time of day, date, calendar appointments, etc. In another example, when the user looks downwards on the vertical axis, the eyewear device 100 may power down.

The right chunk 110B includes chunk body 211 and a chunk cap, with the chunk cap omitted in the cross-section of FIG. 1B. Disposed inside the right chunk 110B are various interconnected circuit boards, such as PCBs or flexible PCBs, that include controller circuits for right visible light camera 114B, microphone(s), low-power wireless circuitry (e.g., for wireless short range network communication via Bluetooth™), high-speed wireless circuitry (e.g., for wireless local area network communication via WiFi).

The right visible light camera 114B is coupled to or disposed on the flexible PCB 140 and covered by a visible light camera cover lens, which is aimed through opening(s) formed in the right chunk 110B. In some examples, the frame 105 connected to the right chunk 110B includes the opening(s) for the visible light camera cover lens. The frame 105 includes a front-facing side configured to face outwards away from the eye of the user. The opening for the visible light camera cover lens is formed on and through the front-facing side. In the example, the right visible light camera 114B has an outwards facing angle of coverage 111B with a line of sight or perspective of the right eye of the user of the eyewear device 100. The visible light camera cover lens can also be adhered to an outwards facing surface of the right chunk 110B in which an opening is formed with an outwards facing angle of coverage, but in a different outwards direction. The coupling can also be indirect via intervening components.

Left (first) visible light camera 114A is connected to a first image display of left optical assembly 180A to generate a first background scene of a first successive displayed image. Right (second) visible light camera 114B is connected to a second image display of right optical assembly 180B to generate a second background scene of a second successive displayed image. The first background scene and the second background scene partially overlap to present a three-dimensional observable area of the successive displayed image.

Flexible PCB 140 is disposed inside the right chunk 110B and is coupled to one or more other components housed in the right chunk 110B. Although shown as being formed on the circuit boards of the right chunk 110B, the right visible light camera 114B can be formed on the circuit boards of the left chunk 110A, the temples 125A-B, or frame 105.

FIG. 2A is a rear view of an example hardware configuration of an eyewear device 100, which includes an eye movement tracker 213 on a frame 105, for tracking the eye movement of the user of the eyewear device 100. As shown in FIG. 2A, the eyewear device 100 is in a form configured for wearing by a user, which are eyeglasses in the example. The eyewear device 100 can take other forms and may incorporate other types of frameworks, for example, a headgear, a headset, or a helmet.

In the eyeglasses example, eyewear device 100 includes a frame 105 including a left rim 107A connected to a right rim 107B via a bridge 106 adapted for a nose of the user. The left and right rims 107A-B include respective apertures 175A-B which hold a respective optical element 180A-B, such as a lens and a display device. As used herein, the term lens is meant to cover transparent or translucent pieces of glass or plastic having curved and/or flat surfaces that cause light to converge/diverge or that cause little or no convergence or divergence.

Although shown as having two optical elements 180A-B, the eyewear device 100 can include other arrangements, such as a single optical element or may not include any optical element 180A-B depending on the application or intended user of the eyewear device 100. As further shown, eyewear device 100 includes a left chunk 110A adjacent the left lateral side 170A of the frame 105 and a right chunk 110B adjacent the right lateral side 170B of the frame 105. The chunks 110A-B may be integrated into the frame 105 on the respective sides 170A-B (as illustrated) or implemented as separate components attached to the frame 105 on the respective sides 170A-B. Alternatively, the chunks 110A-B may be integrated into temples (not shown) attached to the frame 105.

In the example of FIG. 2A, the eye movement tracker 213 of the eyewear device 100 includes an infrared emitter 215 and an infrared camera 220. Visible light cameras typically include a blue light filter to block infrared light detection, in an example, the infrared camera 220 is a visible light camera, such as a low resolution video graphic array (VGA) camera (e.g., 640×480 pixels for a total of 0.3 megapixels), with the blue filter removed. The infrared emitter 215 and the infrared camera 220 are co-located on the frame 105, for example, both are shown as connected to the upper portion of the left rim 107A. As described in further detail below, the frame 105 or one or more of the left and right chunks 110A-B include a circuit board that includes the infrared emitter 215 and the infrared camera 220. The infrared emitter 215 and the infrared camera 220 can be connected to the circuit board by soldering, for example.

Other arrangements of the infrared emitter 215 and infrared camera 220 can be implemented, including arrangements in which the infrared emitter 215 and infrared camera 220 are both on the right rim 107B, or in different locations on the frame 105, for example, the infrared emitter 215 is on the left rim 107A and the infrared camera 220 is on the right rim 107B. In another example, the infrared emitter 215 is on the frame 105 and the infrared camera 220 is on one of the chunks 110A-B, or vice versa. The infrared emitter 215 can be connected essentially anywhere on the frame 105, left chunk 110A, or right chunk 110B to emit a pattern of infrared light on the eye of the user. Similarly, the infrared camera 220 can be connected essentially anywhere on the frame 105, left chunk 110A, or right chunk 110B to capture at least one reflection variation in the emitted pattern of infrared light from the eye of the user.

The infrared emitter 215 and infrared camera 220 are arranged to face inwards towards the eye of the user with a partial or full angle of coverage of the eye in order to pick up an infrared image of the eye to track eye movement of the eye of the user. For example, the infrared emitter 215 and infrared camera 220 are positioned directly in front of the eye, in the upper part of the frame 105 or in the chunks 110A-B at either ends of the frame 105. The eye movement includes a variation of eye direction on a horizontal axis, a vertical axis, or a combination thereof from the initial eye direction during presentation of the initial displayed image on the image display of optical assembly 180A-B.

Eye movement tracker 213 can track eye movement by measuring the point of eye gaze direction (where the user is looking in the optical assembly 180A-B of the eyewear device 100), comparing currently captured images to previously captured calibration images, or detecting motion of the eye relative to the head. For example, eye movement tracker 213 non-invasively measures eye motion utilizing video images from which the eye position is extracted. As noted above, a pattern of infrared light is emitted by the infrared emitter 215 and infrared light is reflected back from the eye with variations which are sensed and imaged by a video camera, such as infrared camera 220. Data forming the picked up infrared image is then analyzed to extract eye rotation from changes in the reflection variations. Such video-based eye movement trackers typically utilize corneal reflection (first Purkinje image) and the center of the pupil as features to track over time. In a second example, the dual-Purkinje eye movement tracker, utilizes reflections from the front of the cornea (first Purkinje image) and the back of the lens (fourth Purkinje image) as features to track. In a third example, image features from inside the eye are tracked, such as the retinal blood vessels, and these features are followed as the eye of the user rotates.

Calibration of the eyewear device 100 based on the unique anatomical features of the eyes of the user may be performed before using the eye movement tracker 213 to track eye position. Generally, the user looks at a point or series of points, while the eye movement tracker 213 records the value that corresponds to each gaze position. Prior to presenting, via the image display of the optical assembly 180A-B, the initial displayed image, eyewear device 100 calibrates the eye movement tracker 213 by presenting, via the image display of optical assembly 180A-B, a series of calibration images for viewing by the eye of the user. Each of the calibration images has a respective point of interest at a respective known fixed position on the horizontal axis and the vertical axis. In response to the eye of the user viewing the respective point of interest, eyewear device 100 records, in an eye direction (e.g., scanpath) database, anatomical feature positions of the eye in relation to the respective known fixed position of the respective point of interest.

After calibration, the video-based eye movement tracker 213 can focus on one or both eyes of the user and records eye movement as the user (e.g., wearer of the eyewear device 100) looks at the image display of optical assembly 180A-B. When infrared or near-infrared non-collimated light is shined on the pupil of the eye as the pattern of infrared light by the infrared emitter 215, corneal reflections are created in the reflection variations of infrared light. The vector between the pupil center and the corneal reflections in the captured infrared images contain the reflection variations of infrared light and can be used to compute the point of regard on surface or the eye gaze direction.

Two general types of infrared and near-infrared (also known as active light) eye movement tracking techniques can be utilized: bright-pupil and dark-pupil. Whether bright-pupil or dark-pupil is utilized depends on the location of the illumination source (infrared emitter 215) with respect to the infrared camera 220 and the eye of the user. If the illumination from the infrared emitter 215 is coaxial with the optical path, then the eye acts as a retroreflector as the light reflects off the retina creating a bright pupil effect similar to red eye. If the illumination from the infrared emitter 215 is offset from the optical path, then the pupil appears dark because the retro reflection from the retina is directed away from the infrared camera 220.

In one example, the infrared emitter 215 of the eye movement tracker 213 emits infrared light illumination on the user's eye, which can be near-infrared light or other short-wavelength beam of low-energy radiation. Alternatively, or additionally, the eye movement tracker 213 may include an emitter that emits other wavelengths of light besides infrared and the eye movement tracker 213 further includes a camera sensitive to that wavelength that receives and captures images with that wavelength. For example, the eye movement tracker 213 may comprise a visible light camera that captures light in the visible light range from the eye, such as a red, green, and blue (RGB) camera.

As noted above, the eyewear device 100 is coupled to a processor and a memory, for example in the eyewear device 100 itself or another part of the system. Eyewear device 100 or the system can subsequently process images captured of the eye, for example, a coupled memory and processor in the system to process the captured images of the eye to track eye movement. Such processing of the captured images establishes a scanpath to identify movement of the user's eye. The scanpath includes the sequence or series of eye movements based on captured reflection variations of the eye. Eye movements are typically divided into such fixations and saccades—when the eye gaze pauses in a certain position, and when it moves to another position, respectively. The resulting series of fixations and saccades is called the scanpath. Smooth pursuit describes the eye following a moving object. Fixational eye movements include micro saccades: small, involuntary saccades that occur during attempted fixation. The scanpaths are then utilized to determine the field of view adjustment.

An eye direction database (see element 950 of FIG. 9A) can be established during calibration. Since the known fixed position of the respective point of interests during calibration are known, that scanpath database (element 950 of FIG. 9A) can be used to establish similarities to the previously calibration images. Because the known fixed position of the point of interest is known when the calibration image and is recorded in the eye direction database, the eyewear device 100 can determine where the eye of the user is looking by comparing currently captured images of the eye with the eye direction database (element 950 of FIG. 9A). The calibration image(s) which mostly closely resembles the currently captured image can have the known fixed position of the point of interest utilized as a good approximation of the eye direction for the currently captured image.

FIG. 2B is a rear view of an example hardware configuration of another eyewear device 200. In this example configuration, the eyewear device 200 is depicted as including an eye movement tracker 213 on a right chunk 210B for tracking the eye movement of the user of the eyewear device. As shown, the infrared emitter 215 and the infrared camera 220 are co-located on the right chunk 210B. It should be understood that the eye movement tracker 213 or one or more components of the eye movement tracker 213 can be located on the left chunk 210A and other locations of the eyewear device 200, for example, the frame 105. Eye movement tracker 213 has an infrared emitter 215 and infrared camera 220 like that of FIG. 2A, but the eye movement tracker 213 can be varied to be sensitive to different light wavelengths as described previously in FIG. 2A.

Similar to FIG. 2A, the eyewear device 200 includes a frame 105 which includes a left rim 107A which is connected to a right rim 107B via a bridge 106; and the left and right rims 107A-B include respective apertures which hold a respective optical element 180A-B.

Figure 2C:
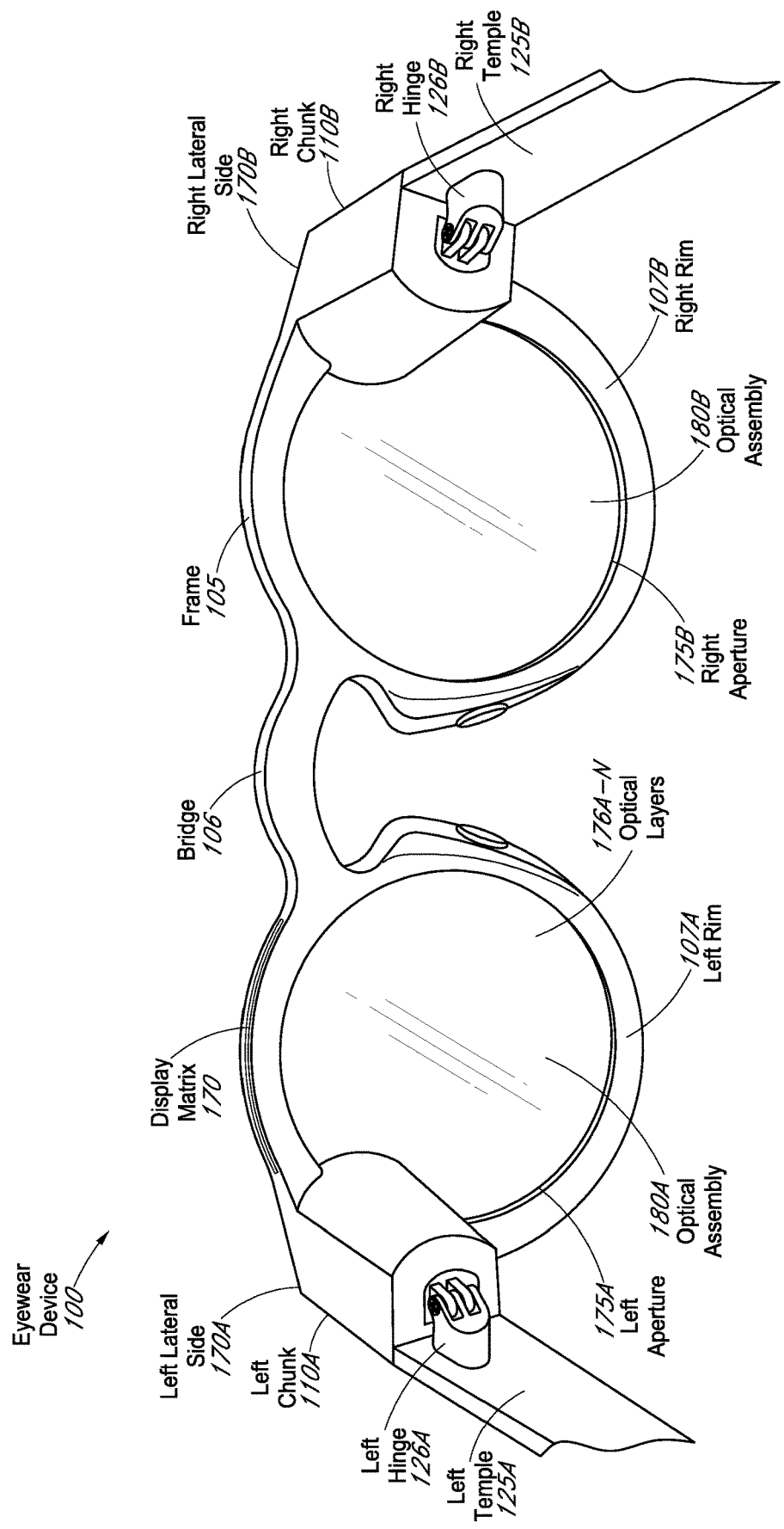
FIGS. 2C and 2D are rear views of example hardware configurations of the eyewear device, including two different types of image displays.
Figure 2D:
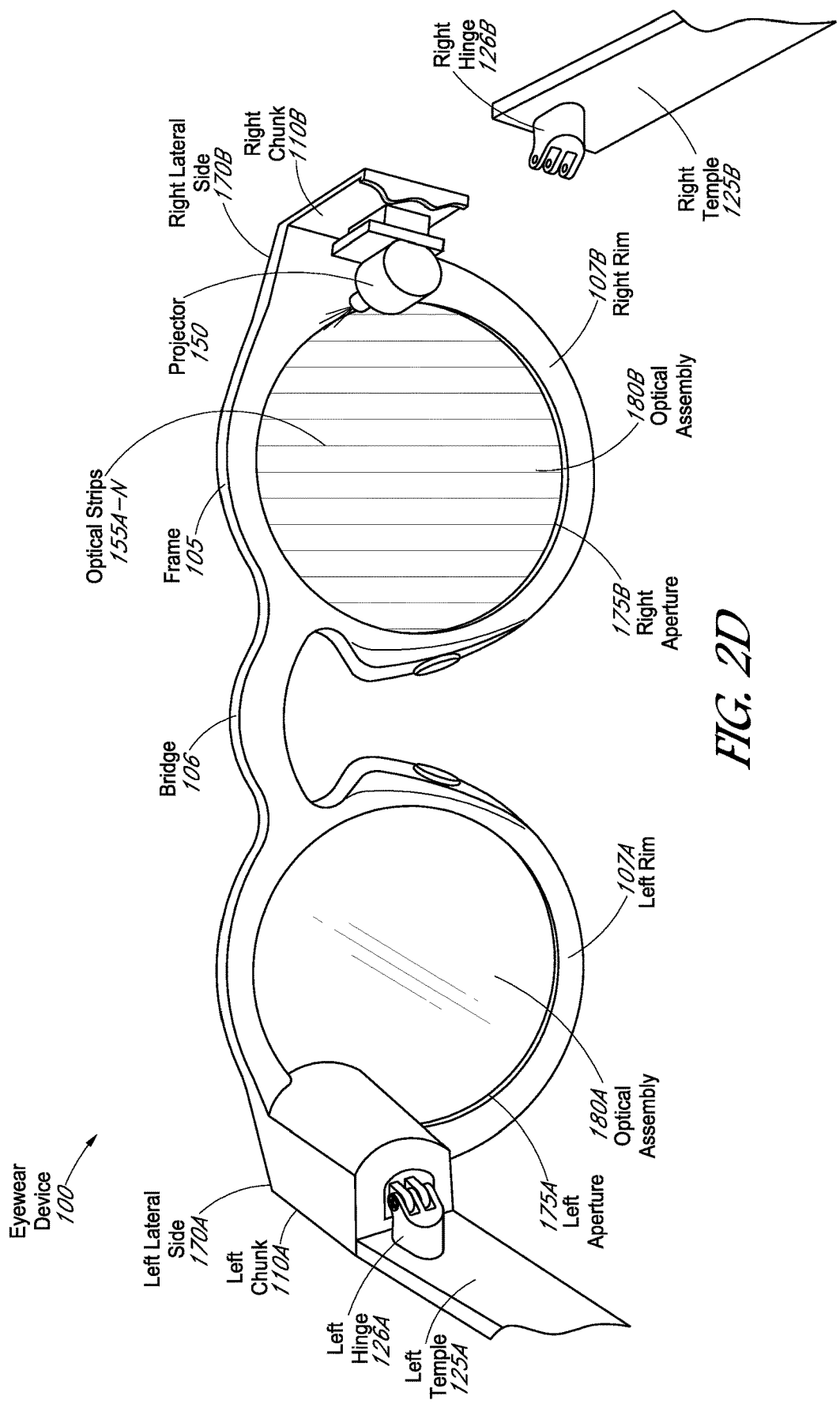

FIGS. 2C-D are rear views of example hardware configurations of the eyewear device 100, including two different types of image displays. In one example, the image display of optical assembly 180A-B includes an integrated image display. As shown in FIG. 2C, the optical assembly 180A-B includes a suitable display matrix 170 of any suitable type, such as a liquid crystal display (LCD), an organic light-emitting diode (OLED) display, or any other such display. The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N extends over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism is sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the display matrix 170, and the light travels through the prism so that the image viewed from the second surface is larger in one or more dimensions than the image emitted from the display matrix 170.

In another example, the image display device of optical assembly 180A-B includes a projection image display as shown in FIG. 2D. The optical assembly 180A-B includes a laser projector 150, which is a three-color laser projector using a scanning mirror or galvanometer. During operation, an optical source such as a laser projector 150 is disposed in or on one of the temples 125A-B of the eyewear device 100. Optical assembly 180-B includes one or more optical strips 155A-N spaced apart across the width of the lens of the optical assembly 180A-B or across a depth of the lens between the front surface and the rear surface of the lens.

As the photons projected by the laser projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A-B, the eyewear device 100 can include other arrangements, such as a single or three optical assemblies, or the optical assembly 180A-B may have arranged different arrangement depending on the application or intended user of the eyewear device 100.

As further shown in FIGS. 2C-D, eyewear device 100 includes a left chunk 110A adjacent the left lateral side 170A of the frame 105 and a right chunk 110B adjacent the right lateral side 170B of the frame 105. The chunks 110A-B may be integrated into the frame 105 on the respective lateral sides 170A-B (as illustrated) or implemented as separate components attached to the frame 105 on the respective sides 170A-B. Alternatively, the chunks 110A-B may be integrated into temples 125A-B attached to the frame 105 via hinges 126A-B.

In one example, the image display includes a first image display and a second image display. Eyewear device 100 includes first and second apertures 175A-B which hold a respective first and second optical assembly 180A-B. The first optical assembly 180A includes the first image display (e.g., a display matrix 170A of FIG. 2C or optical strips 155A-N' and a projector 150A). The second optical assembly 180B includes the second image display e.g., a display matrix 170B of FIG. 2C or optical strips 155A-N" and a projector 150B). The successive field of view of the successive displayed image includes an angle of view between about 15° to 30, and more specifically 24°, measured horizontally, vertically, or diagonally. The successive displayed image having the successive field of view represents a combined three-dimensional observable area visible through stitching together of two displayed images presented on the first and second image displays.

As used herein, "an angle of view" describes the angular extent of the field of view associated with the displayed images presented on each of the left and right image displays of optical assembly 180A-B. The "angle of coverage" describes the angle range that a lens of visible light cameras 114A-B or infrared camera 220 can image. Typically, the image circle produced by a lens is large enough to cover the film or sensor completely, possibly including some vignetting toward the edge. If the angle of coverage of the lens does not fill the sensor, the image circle will be visible, typically with strong vignetting toward the edge, and the effective angle of view will be limited to the angle of coverage. The "field of view" is intended to describe the field of observable area which the user of the eyewear device 100 can see through his or her eyes via the displayed images presented on the left and right image displays of the optical assembly 180A-B. Image display of optical assembly 180A-B can have a field of view with an angle of coverage between 15° to 30°, for example 24°, and have a resolution of 480×480 pixels.

Figure 3:
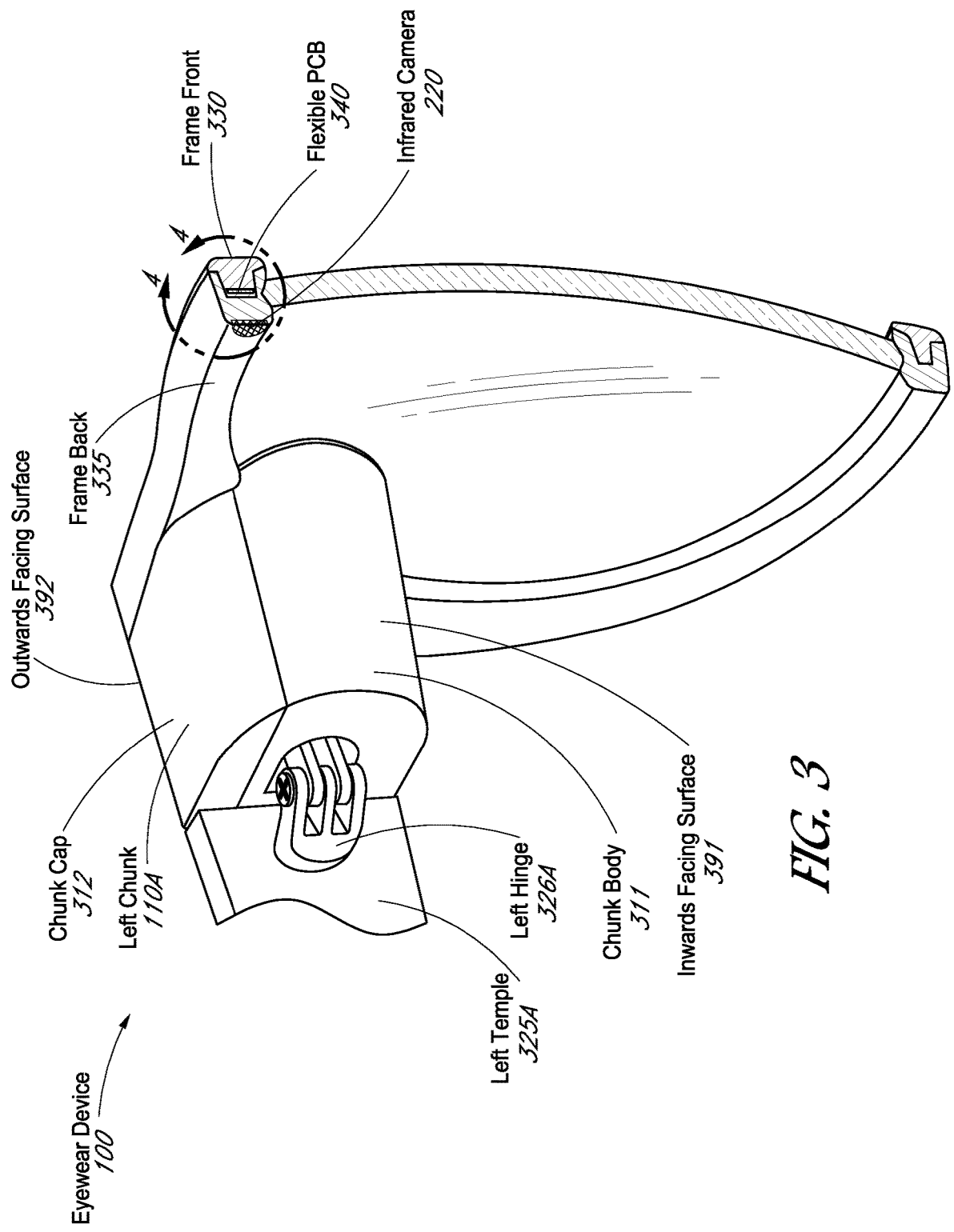
FIG. 3 shows a rear perspective sectional view of the eyewear device of FIG. 2A depicting an infrared camera, a frame front, a frame back, and a circuit board.

FIG. 3 shows a rear perspective sectional view of the eyewear device of FIG. 2A depicting an infrared camera 220, a frame front 330, a frame back 335, and a circuit board. It can be seen that the upper portion of the left rim 107A of the frame 105 of the eyewear device 100 includes a frame front 330 and a frame back 335. The frame front 330 includes a front-facing side configured to face outwards away from the eye of the user. The frame back 335 includes a rear-facing side configured to face inwards towards the eye of the user. An opening for the infrared camera 220 is formed on the frame back 335.

As shown in the encircled cross-section 4-4 of the upper middle portion of the left rim of the frame, a circuit board, which is a flexible printed circuit board (PCB) 340, is sandwiched between the frame front 330 and the frame back 335. Also shown in further detail is the attachment of the left chunk 110A to the left temple 325A via a left hinge 326A. In some examples, components of the eye movement tracker 213, including the infrared camera 220, the flexible PCB 340, or other electrical connectors or contacts may be located on the left temple 325A or the left hinge 326A.

In an example, the left chunk 110A includes a chunk body 311, a chunk cap 312, an inwards facing surface 391 and an outwards facing surface 392 (labeled, but not visible).

Disposed inside the left chunk 110A are various interconnected circuit boards, such as PCBs or flexible PCBs, which include controller circuits for charging, a battery, inwards facing light emitting diodes (LEDs), and outwards (forward) facing LEDs.

Figure 4:
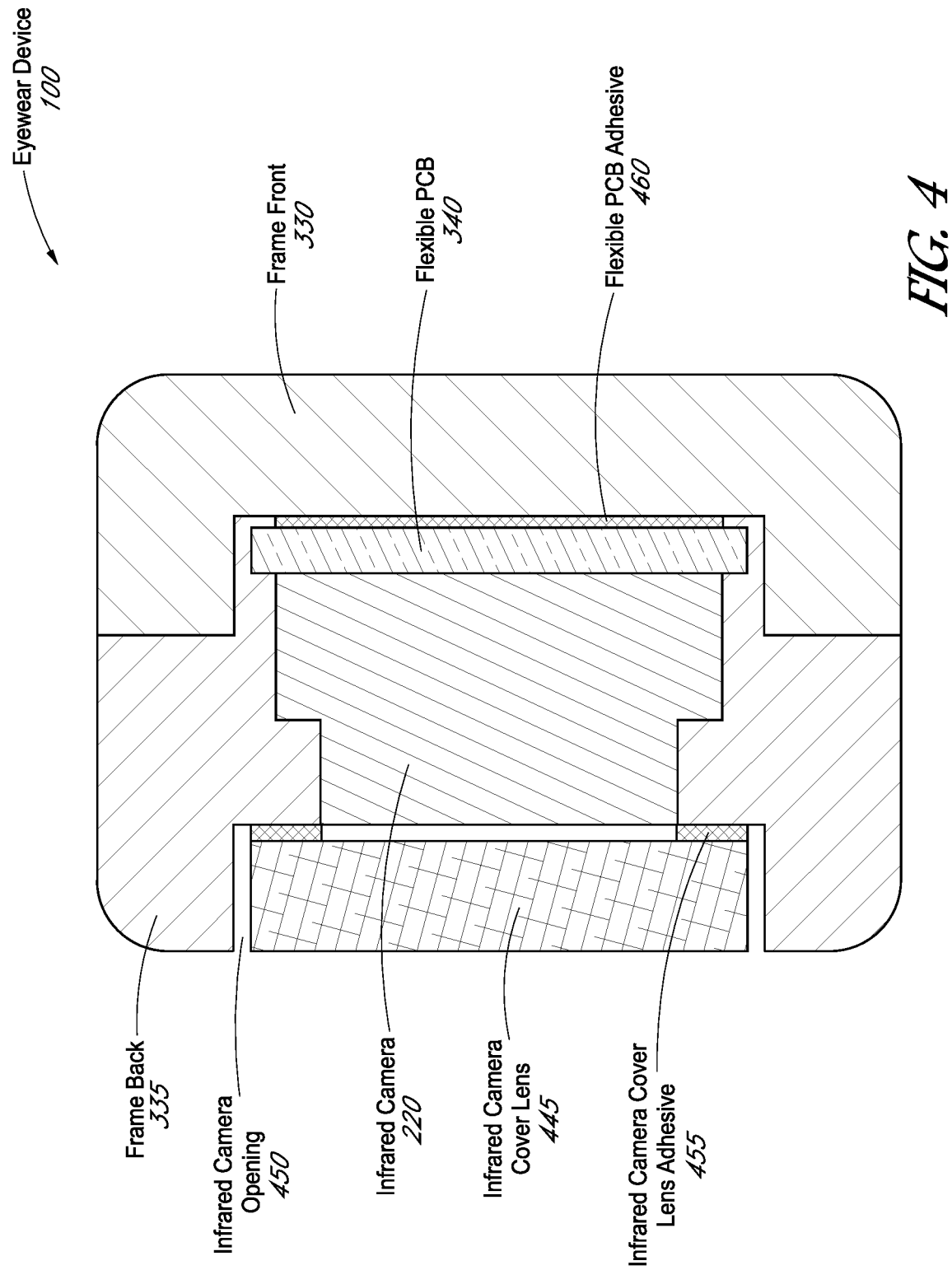
FIG. 4 is a cross-sectional view taken through the infrared camera and the frame of the eyewear device of FIG. 3.

FIG. 4 is a cross-sectional view through the infrared camera 220 and the frame corresponding to the encircled cross-section 4-4 of the eyewear device of FIG. 3. Various layers of the eyewear device 100 are visible in the cross-section of FIG. 4. As shown, the flexible PCB 340 is disposed on the frame front 330 and connected to the frame back 335. The infrared camera 220 is disposed on the flexible PCB 340 and covered by an infrared camera cover lens 445. For example, the infrared camera 220 is reflowed to the back of the flexible PCB 340. Reflowing attaches the infrared camera 220 to electrical contact pad(s) formed on the back of the flexible PCB 340 by subjecting the flexible PCB 340 to controlled heat which melts a solder paste to connect the two components. In one example, reflowing is used to surface mount the infrared camera 220 on the flexible PCB 340 and electrically connect the two components. However, it should be understood that through-holes can be used to connect leads from the infrared camera 220 to the flexible PCB 340 via interconnects, for example.

The frame back 335 includes an infrared camera opening 450 for the infrared camera cover lens 445. The infrared camera opening 450 is formed on a rear-facing side of the frame back 335 that is configured to face inwards towards the eye of the user. In the example, the flexible PCB 340 can be connected to the frame front 330 via a flexible PCB adhesive 460. The infrared camera cover lens 445 can be connected to the frame back 335 via infrared camera cover lens adhesive 455. The connection can be indirect via intervening components.

Figure 5:
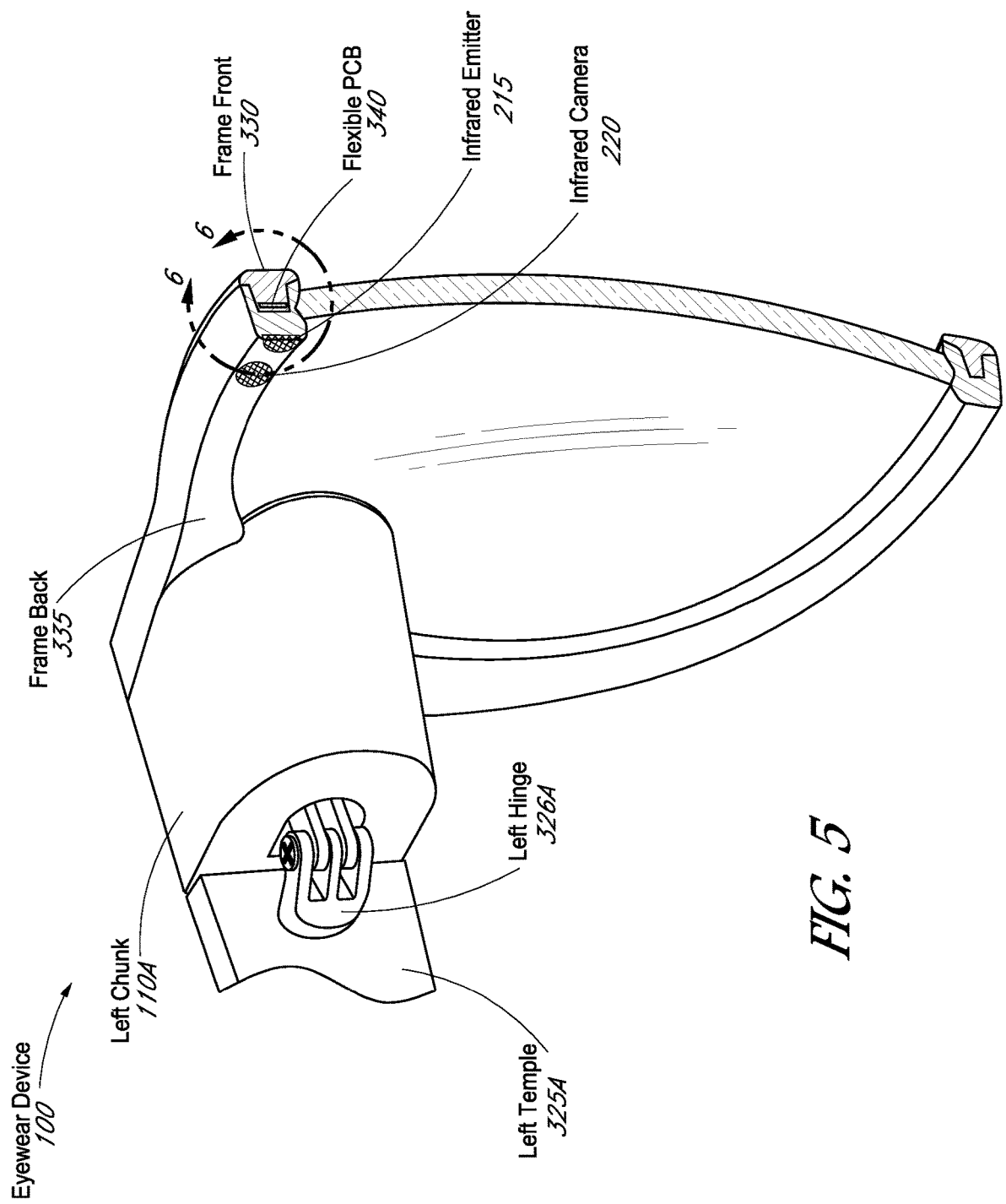
FIG. 5 shows a rear perspective sectional view of the eyewear device of FIG. 2A depicting an infrared emitter, an infrared camera, a frame front, a frame back, and a circuit board.

FIG. 5 shows a rear perspective view of the eyewear device of FIG. 2A. The eyewear device 100 includes an infrared emitter 215, infrared camera 220, a frame front 330, a frame back 335, and a circuit board 340. As in FIG. 3, it can be seen in FIG. 5 that the upper portion of the left rim of the frame of the eyewear device 100 includes the frame front 330 and the frame back 335. An opening for the infrared emitter 215 is formed on the frame back 335.

As shown in the encircled cross-section 6-6 in the upper middle portion of the left rim of the frame, a circuit board, which is a flexible PCB 340, is sandwiched between the frame front 330 and the frame back 335. Also shown in further detail is the attachment of the left chunk 110A to the left temple 325A via the left hinge 326A. In some examples, components of the eye movement tracker 213, including the infrared emitter 215, the flexible PCB 340, or other electrical connectors or contacts may be located on the left temple 325A or the left hinge 326A.

Figure 6:
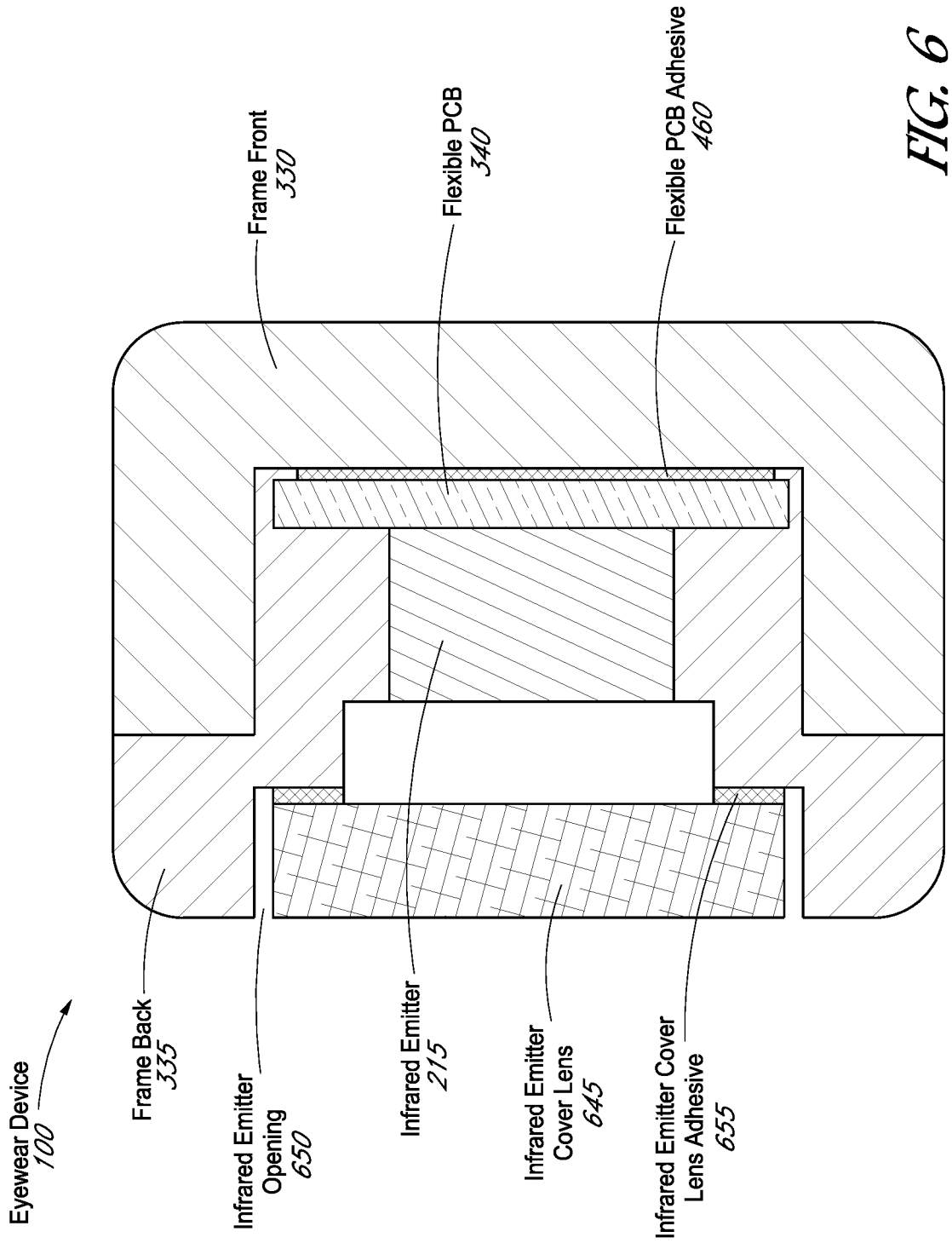
FIG. 6 is a cross-sectional view taken through the infrared emitter and the frame of the eyewear device of FIG. 5.

FIG. 6 is a cross-sectional view through the infrared emitter 215 and the frame corresponding to the encircled cross-section 6-6 of the eyewear device of FIG. 5. Multiple layers of the eyewear device 100 are illustrated in the cross-section of FIG. 6, as shown the frame includes the frame front 330 and the frame back 335. The flexible PCB 340 is disposed on the frame front 330 and connected to the frame back 335. The infrared emitter 215 is disposed on the flexible PCB 340 and covered by an infrared emitter cover lens 645. For example, the infrared emitter 215 is reflowed to the back of the flexible PCB 340. Reflowing attaches the infrared emitter 215 to contact pad(s) formed on the back of the flexible PCB 340 by subjecting the flexible PCB 340 to controlled heat which melts a solder paste to connect the two components. In one example, reflowing is used to surface mount the infrared emitter 215 on the flexible PCB 340 and electrically connect the two components. However, it should be understood that through-holes can be used to connect leads from the infrared emitter 215 to the flexible PCB 340 via interconnects, for example.

The frame back 335 includes an infrared emitter opening 650 for the infrared emitter cover lens 645. The infrared emitter opening 650 is formed on a rear-facing side of the frame back 335 that is configured to face inwards towards the eye of the user. In the example, the flexible PCB 340 can be connected to the frame front 330 via the flexible PCB adhesive 460. The infrared emitter cover lens 645 can be connected to the frame back 335 via infrared emitter cover lens adhesive 655. The coupling can also be indirect via intervening components.

Figure 7:
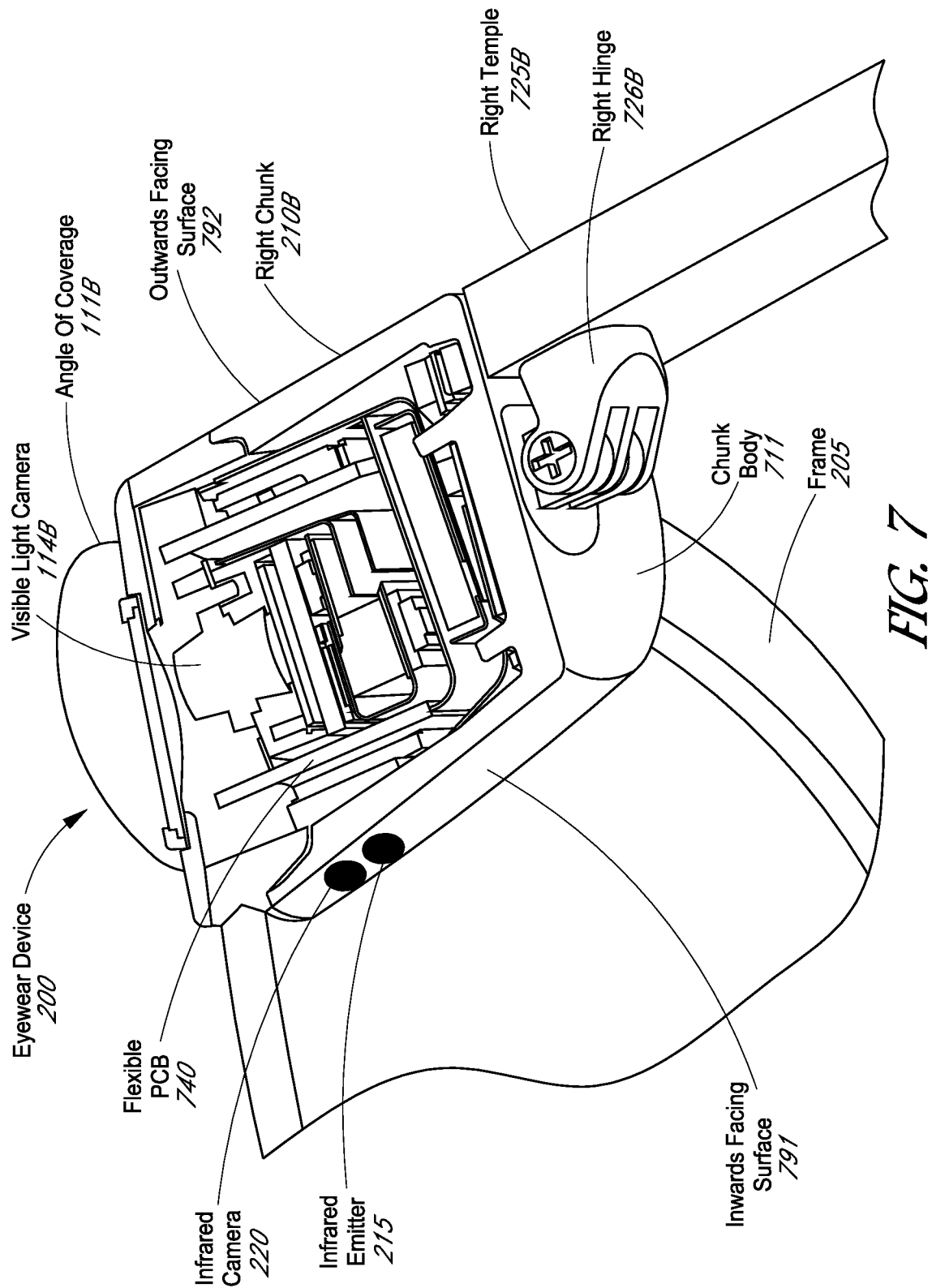
FIG. 7 is a top cross-sectional view of the chunk of the eyewear device of FIG. 2B depicting the visible light camera, the infrared emitter, the infrared camera, and a circuit board.

FIG. 7 is a top cross-sectional view of the right chunk 210B of the eyewear device of FIG. 2B. As shown, the eyewear device 200 includes the infrared emitter 215, the infrared camera 220, and a circuit board, which may be a flexible PCB 740. The right chunk 210B is connected to a right temple 725B of the eyewear device 200 via the right hinge 726B. In some examples, components of the eye movement tracker, including the infrared emitter 215 and the infrared camera 220, the flexible PCB 740, or other electrical connectors or contacts may be located on the right temple 725B or the right hinge 726B.

The right chunk 710B includes chunk body 711, an inwards facing surface 791, and an outwards facing surface 792. The right chunk 710B also includes a chunk cap (not shown) like the chunk cap 312 for the left chunk in FIG. 3, but the chunk cap is removed in the cross-section of FIG. 7. Disposed inside the right chunk 210B are various interconnected circuit boards, such as PCBs or flexible PCBs, that include controller circuits for a visible light camera 714, microphone(s), low-power wireless circuitry (e.g., for wireless short range network communication via Bluetooth™), high-speed wireless circuitry (e.g., for wireless local area network communication via WiFi).

The right visible light camera 114B is disposed on a circuit board and covered by a visible camera cover lens and has an outwards facing angle of coverage 111B. The frame front, which is connected to the right chunk 210B, and the right chunk 210B can include opening(s) for the visible light camera cover lens. The frame front includes a front-facing side configured to face outwards away from the eye of the user. The opening for the visible light camera cover lens is formed on and through the front-facing side. The infrared emitter 215 and infrared camera 220 have an inwards facing angle of coverage relative to the right visible light camera 114B having the outwards facing angle of coverage.

As shown, the infrared emitter 215 and the infrared camera 220 are co-located on the inwards facing surface 791 of the right chunk 210B to point inwards towards the eye of the user. The inwards facing surface 791 can be sloped such that it curves away from the upper portion of the right rim of the frame 205 where the inwards facing surface 791 intersects the right rim and towards the right temple 725B to orient the infrared emitter 215 and infrared camera 220 with an inwards facing field of view and a line of sight of the eye of the user.

The infrared emitter 215 and the infrared camera 220 are coupled to the flexible PCB 740 in a manner that is similar to that shown and described with reference to FIGS. 3-6. For example, the flexible PCB 740 is disposed inside the right chunk 710B between inwards facing surface 791 and the outwards facing surface 792 of the right chunk 210B. Flexible PCB 740 is coupled to one or more other components housed in the right chunk 210B. The infrared emitter 215 is disposed on the flexible PCB 740 and an infrared emitter cover lens covers the infrared emitter 215. The infrared camera 220 is also disposed on the flexible PCB 740 and an infrared camera cover lens covers the infrared emitter 215. Although shown as being formed on the circuit boards of the right chunk 210B, the eye movement tracker, including the infrared emitter 215 and the infrared camera 220, can be formed on the circuit boards of the left chunk as shown in FIG. 3.

An infrared camera opening and infrared emitter opening are both formed on the inwards facing surface 791 of the right chunk 210B that are configured to face inwards towards the eye of the user. In the example, the flexible PCB 740 can be connected to the inwards facing surface 791 and outwards facing surface 792 via a flexible PCB adhesive. The infrared emitter cover lens and infrared camera cover lens can be connected to the inwards facing surface 791 via a cover lens adhesive. The coupling can also be indirect via intervening components.

Figure 8A:
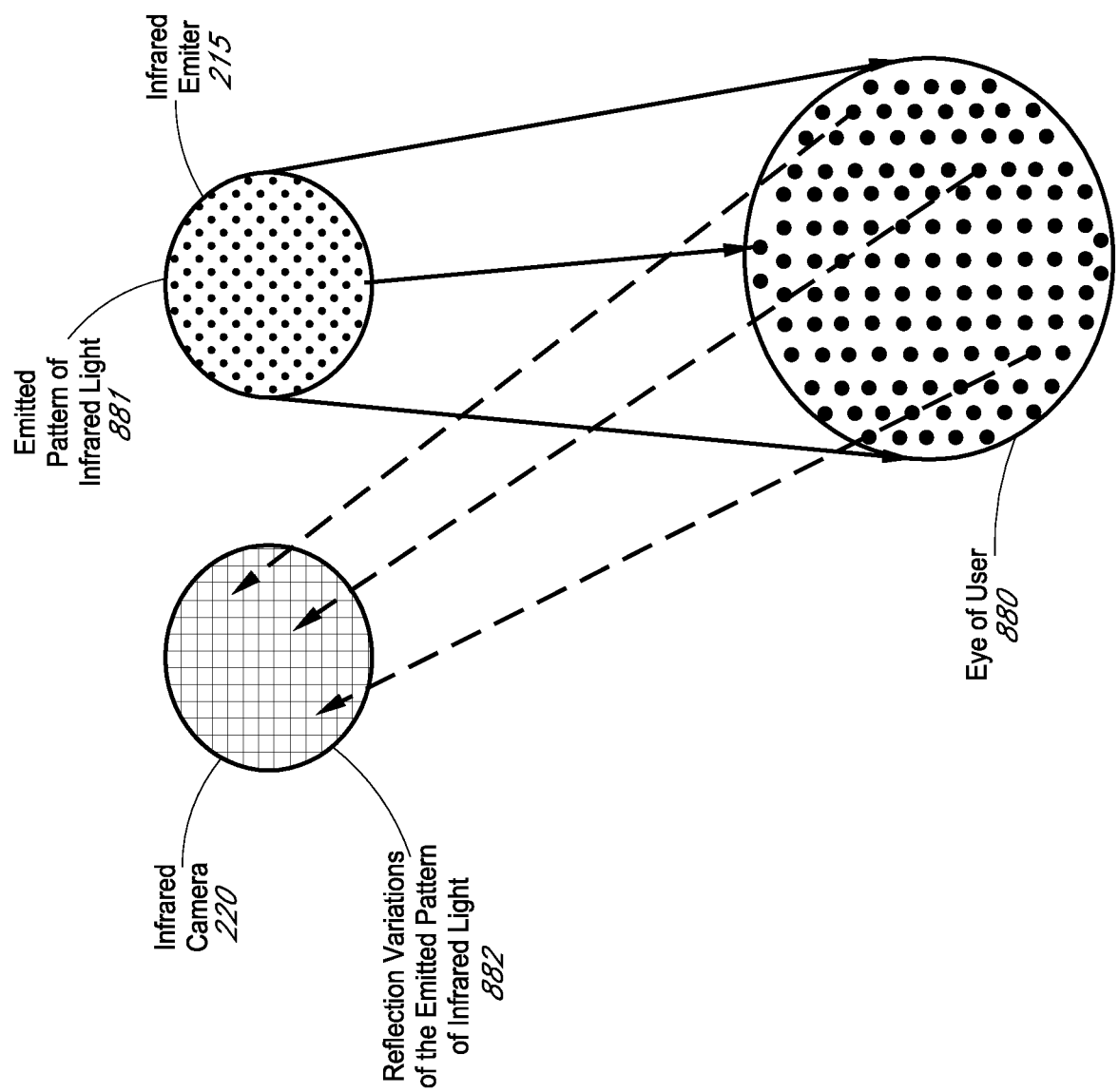
FIG. 8A depicts an example of a pattern of infrared light emitted by an infrared emitter of the eyewear device and reflection variations of the emitted pattern of infrared light captured by the infrared camera of the eyewear device to track eye movement by the user.
Figure 8B:
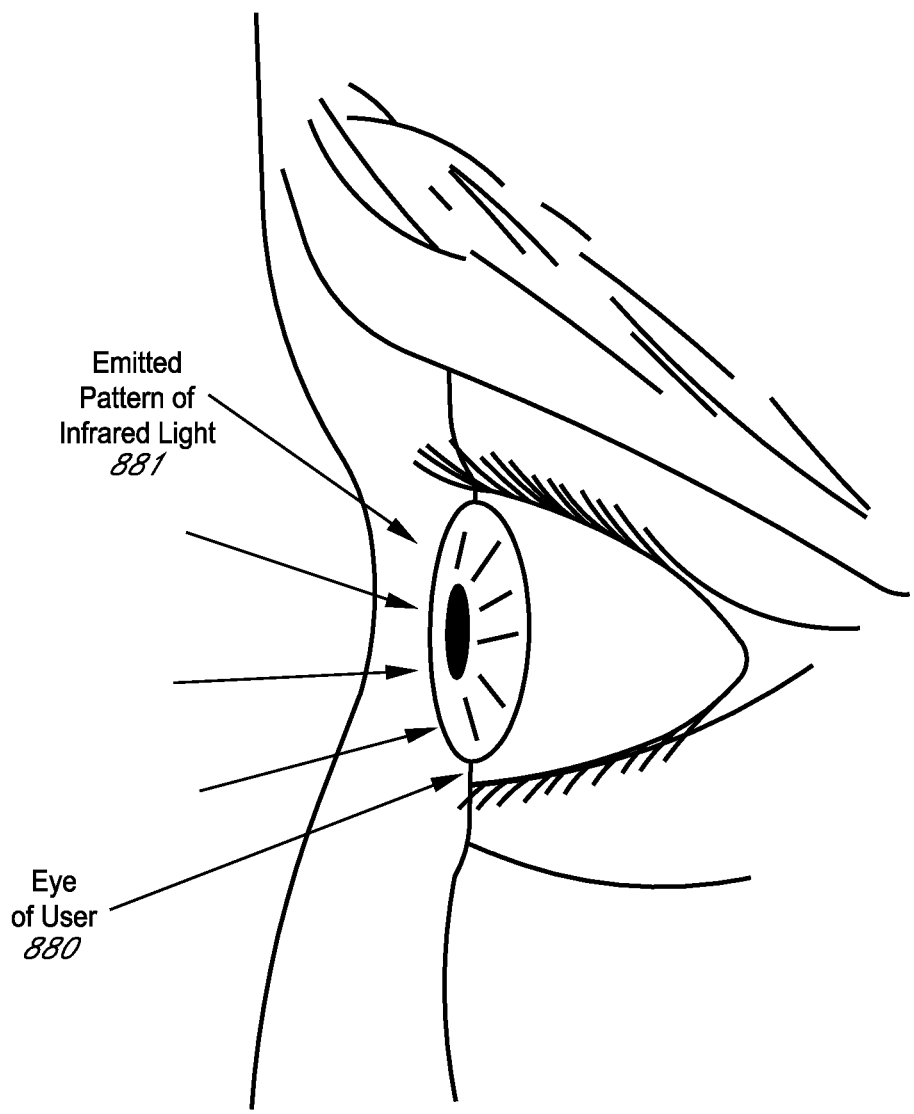
FIG. 8B depicts the emitted pattern of infrared light being emitted by the infrared emitter of the eyewear device in an inwards facing angle of coverage towards an eye of the user to track eye movement by the user.

FIG. 8A depicts an example of a pattern of infrared light emitted by an infrared emitter 215 of the eyewear device and reflection variations of the emitted pattern of infrared light captured by the infrared camera 220 of the eyewear device 100 to track eye movement by the user. FIG. 8B depicts the emitted pattern of infrared light 881 emitted by the infrared emitter 215 of the eyewear device in an inwards facing angle of coverage towards an eye of a user 880 to track eye movement by the user.

The pattern of infrared light 881 can be a standardized matrix or beam of pixels that will outline a uniform light trace on the eye of the user 880 (e.g., cornea, pupil, retina or iris). When the emitted pattern of infrared light 881 strikes the eye of the user 880, the infrared camera 220 captures the reflection variations of the emitted pattern of infrared light 882, which can then be used to track eye movement by comparing positions of the anatomical structures of the eye in the captured infrared images with an eye direction database (element 950 of FIG. 9A) generated during calibration (e.g., to determine a scanpath). The eye direction database (element 950 of FIG. 9A) associates anatomical structures of the eye which are specific to the user with known fixed positions of a point of interest to determine eye movement angle changes. After the anatomical structures in the captured images are identified, those anatomical structures can be mapped to the calibrated images associated with a known fixed position associated with points of interest to determine a corresponding eye direction of the user. A similarity analysis can be performed by comparing the anatomical structures in the captured infrared images with the calibrated images in the eye direction database (element 950 of FIG. 9A). The calibrated image(s) in the eye direction database which match the positioning of the anatomical structures in the captured infrared images the closest have a corresponding known fixed position of a respective point of interest retrieved from the eye direction database (element 950 of FIG. 9A). The eye direction position can then be measured based on the respective known fixed position of the respective point of interest.

Emitted pattern of infrared light 881 is an unperceived low-energy infrared beam that shines on the eye with a standardized path. The amount of reflection of the emitted pattern of infrared light 881 varies in different parts of the eye (e.g., retinal blood vessels absorb light more than surrounding tissue) and the iris. Infrared camera 220 captures these reflection variations of the emitted pattern of infrared light 882, which is digitized by the components of the system. For example, the wearable device includes or is coupled to image processor, memory, and processor for digitizing the reflection variations of the emitted pattern of infrared light 882. The reflection variations of the emitted pattern of infrared light 882 can then be compared to the eye direction database (element 950 of FIG. 9A) detect eye movement.

To initially set up the user in the system during calibration, the reflection variations of the emitted pattern of infrared light 882 from the user's eye can be stored in the eye direction database of calibration images (element 950 of FIG. 9A), which includes images of the left and right eyes of the user. The system may then subsequently compare received reflection variations to this database to track eye movement of the user. In an example, when the user is utilizing an eyewear device 100 for the first time, the infrared emitter 215 emits the emitted pattern of infrared light 881 and the infrared camera 220 captures multiple images of the reflection variations of the emitted pattern of infrared light 882 in different parts of the user's eye(s). Eyewear device 100 presents, via the image display of optical assembly 180A-B, a series of calibration images for viewing by the eye of the user. Each of the calibration images has a respective point of interest at a respective known fixed position on the horizontal axis and the vertical axis. Eyewear device 100 stores the captured calibration images with the corresponding known position of the point of interest at the time the calibration image was captured in the eye direction database of calibration images (element 950 of FIG. 9A) for subsequent analysis. For example, in response to the eye of the user viewing the respective point of interest, eyewear device 100 records in the eye direction database (element 950 of FIG. 9A), anatomical feature positions of the eye in relation to the respective known fixed position of the respective point of interest.

If this is the first time the user has used the eyewear device 100, the eyewear device 100 will find no previously captured calibration images exist in the eye direction database (element 950 of FIG. 9A) that match the currently captured reflection variations of the emitted pattern of infrared light 882. In response to finding no matching captured infrared calibration image exists, the eyewear device 100 updates the eye direction database (element 950 of FIG. 9A) to store digitized images of the currently captured reflection variations of the emitted pattern of infrared light 882 as calibration images in the eye direction database (element 950 of FIG. 9A). During a subsequent use of the eyewear device at a later time, the updated database with the digitized reflection variations that were previously stored in the eye direction database (element 950 of FIG. 9A) are analyzed using algorithms. In one example, the algorithms employ mathematical and statistical techniques for pattern recognition of anatomical features to determine whether at least one subsequently captured image of reflection variations of that same user of the eyewear device 100 matches one or more of the previously captured digitized images that are stored and exist in the eye direction database (element 950 of FIG. 9A) to determine eye direction based on the known fixed position.

In an example, eyewear device 100 tracks, via the eye movement tracker 213, the eye movement of the eye of the user by initially emitting, via the infrared emitter 215, the pattern of infrared light 881A on the eye of the user 880 of the eyewear device 100. Eyewear device 100 captures, via the infrared camera, initial reflection variations 882A in the initially emitted pattern of infrared light 881A on the eye of the user 880. Eyewear device 100 measures, the initial eye direction on the horizontal axis, the vertical axis, or the combination thereof by comparing the initial reflection variations of the initially emitted pattern of infrared light on the eye of the user 880 against the eye direction database (element 950 of FIG. 9A). Eyewear device 100 successively emits, via the infrared emitter 220, the pattern of infrared light 881B on the eye of the user 880 of the eyewear device 100. Eyewear device captures, via the infrared camera 220, successive reflection variations 882B in the successively emitted pattern of infrared light 881B on the eye of the user. Eyewear device 100 measures, the successive eye direction on the horizontal axis, the vertical axis, or the combination thereof by comparing the successive reflection variations 882B of the successively emitted pattern of infrared light 881B on the eye of the user against the eye direction database (element 950 of FIG. 9A). Eyewear device 100 determines the variation of head direction based on both the initial eye direction and the successive eye direction. It should be understood that the foregoing functionality can be embodied in programming instructions of a user interface field of view adjustment application or programming found in one or more components of the system.

Figure 9A:
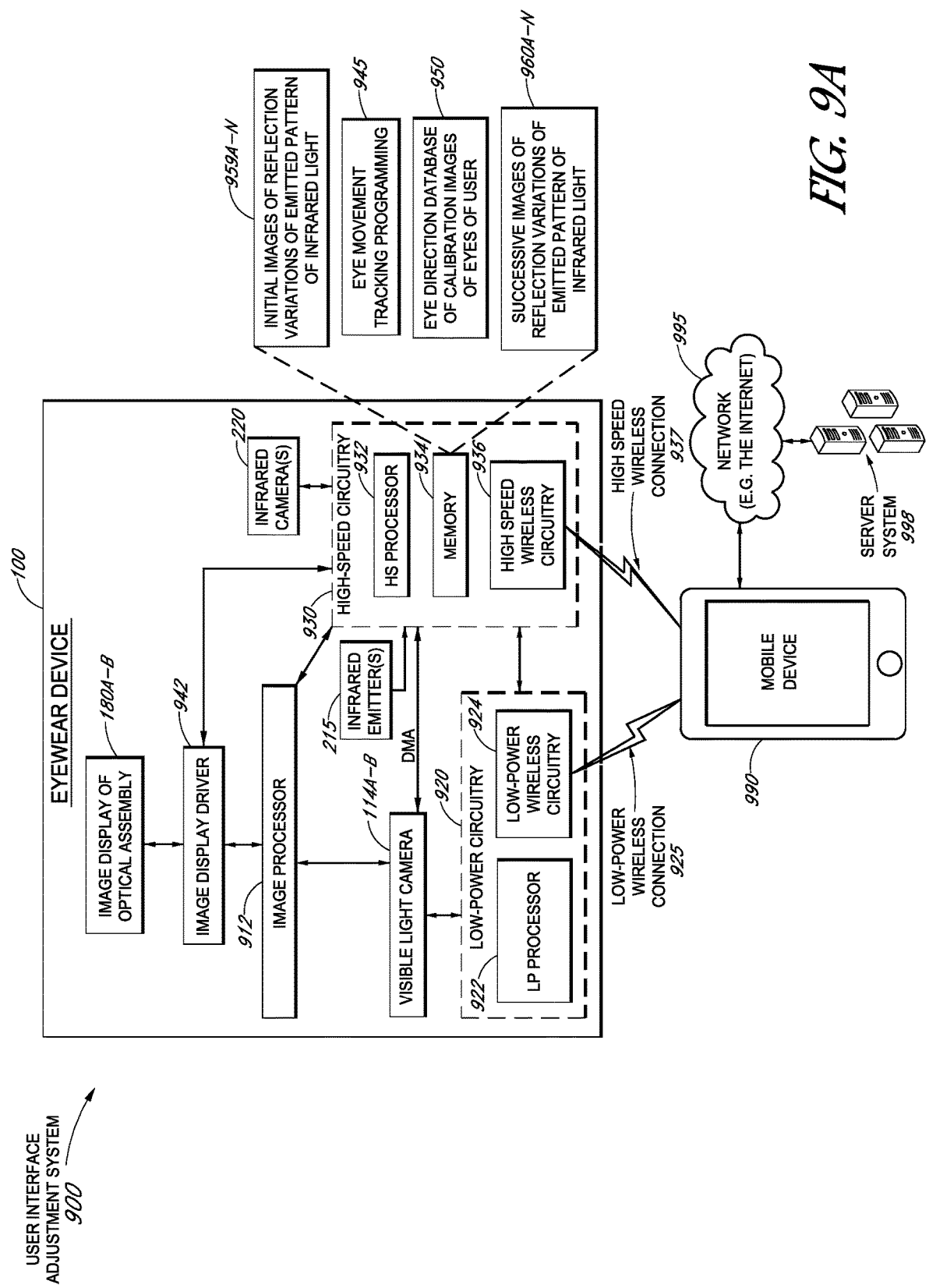
FIG. 9A is a high-level functional block diagram of an example user interface field of view adjustment system including the eyewear device with an eye movement tracker, a mobile device, and a server system connected via various networks.

FIG. 9A is a high-level functional block diagram of an example user interface field of view adjustment system 900. The user interface adjustment system 900 includes a wearable device, which is the eyewear device 100 with an eye movement tracker 213 (e.g., shown as infrared emitter 215 and infrared camera 220), in the example. User interface adjustments system 900 also includes a mobile device 990 and a server system 998 connected via various networks. Mobile device 990 may be a smartphone, tablet, laptop computer, access point, or any other such device capable of connecting with eyewear device 100 using both a low-power wireless connection 925 and a high-speed wireless connection 937. Mobile device 990 is connected to server system 998 and network 995. The network 995 may include any combination of wired and wireless connections.

Eyewear device 100 includes at least two visible light cameras 114A-B (one associated with the left lateral side 170A and one associated with the right lateral side 170B). Eyewear device 100 further includes two image displays of the optical assembly 180A-B (one associated with the left lateral side 170A and one associated with the right lateral side 170B). Eyewear device 100 also includes image display driver 942, image processor 912, low-power circuitry 920, and high-speed circuitry 930. The components shown in FIG. 9A for the eyewear device 100 are located on one or more circuit boards, for example a PCB or flexible PCB, in the temples. Alternatively or additionally, the depicted components can be located in the chunks, frames, hinges, or bridge of the eyewear device 100. Left and right visible light cameras 114A-B can include digital camera elements such as a complementary metal-oxide-semiconductor (CMOS) image sensor, charge coupled device, a lens, or any other respective visible or light capturing elements that may be used to capture data, including images of scenes with unknown objects.

Memory 934 includes an eye direction database of calibrated images of eyes of the user 950 that are captured during the calibration procedure of the eye movement tracker 213. Memory 934 further includes initial images of reflection variations of the emitted pattern of infrared light 959A-N and successive images of reflection variations of emitted pattern of infrared light 960A-N. Memory 934 further includes eye movement tracking programming 945 to perform the functions described herein, including the user interface field of view adjustment interactions with the displayed content presented on left and right image displays of optical assembly 180A-B.

Figure 12:
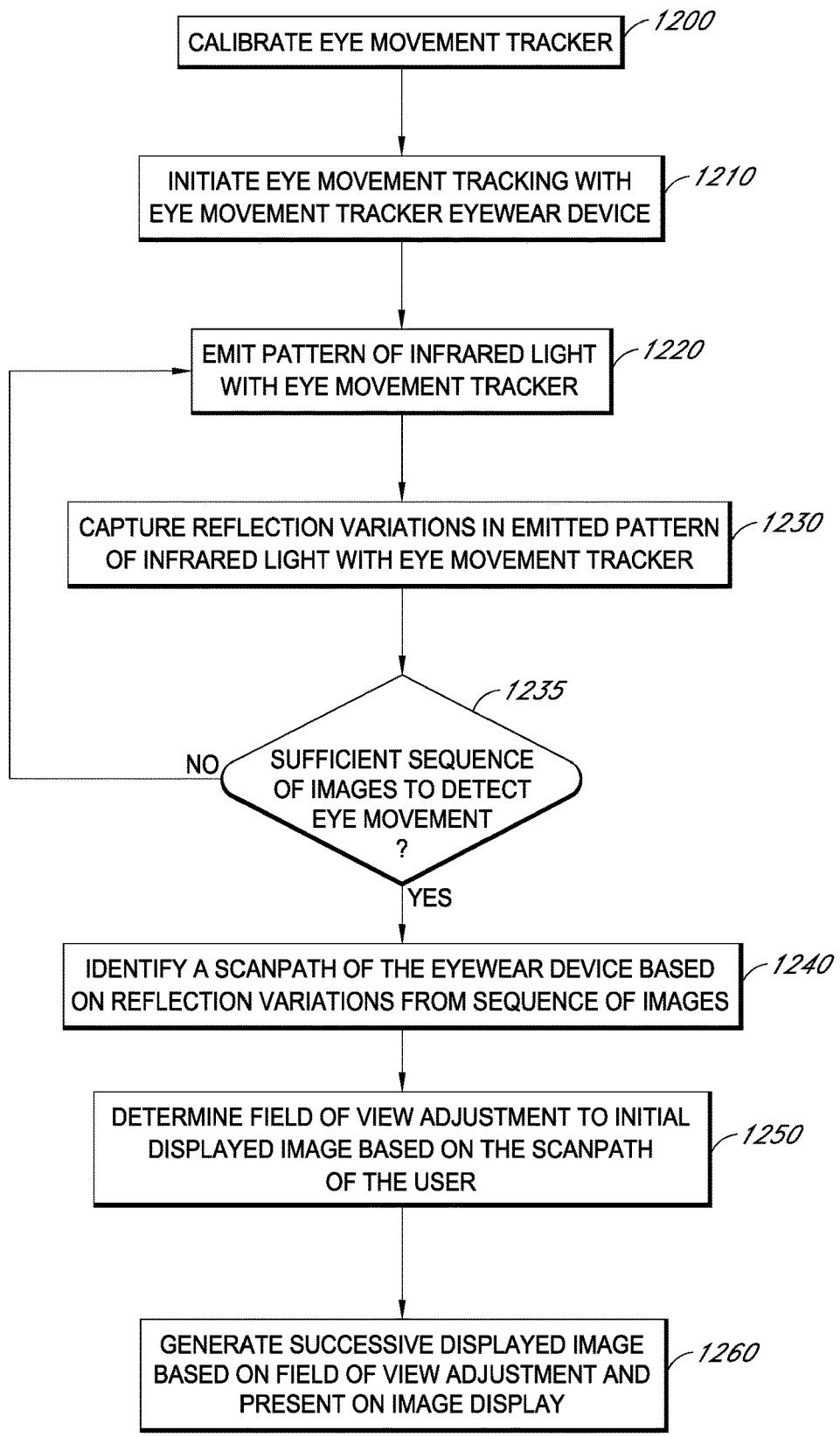
FIG. 12 is a flowchart of the operation of the eyewear device to implement user interface field of view adjustments utilizing the eye movement tracker.

Eye movement tracking programming 945 implements the user interface field of view adjustment instructions, including, to cause the eyewear device 100 to track, via the eye movement tracker 213, the eye movement of the eye of the user of the eyewear device 100. Other implemented instructions (functions) cause the eyewear device 100 to determine, a field of view adjustment to the initial field of view of an initial displayed image based on the detected eye movement of the user corresponding to a successive eye direction. Further implemented instructions generate a successive displayed image of the sequence of displayed images based on the field of view adjustment. The successive displayed image is produced as visible output to the user via the user interface. This visible output appears on the image display of optical assembly 180A-B, which is driven by image display driver 942 to present the sequence of displayed images, including the initial displayed image with the initial field of view and the successive displayed image with the successive field of view. A flowchart outlining functions which can be implemented in the eye movement tracking programing 945 is shown in FIG. 12.

As shown in FIG. 9A, high-speed circuitry 930 includes high-speed processor 932, memory 934, and high-speed wireless circuitry 936. In the example, the image display driver 942 is coupled to the high-speed circuitry 930 and operated by the high-speed processor 932 in order to drive the left and right image displays of the optical assembly 180A-B. High-speed processor 932 may be any processor capable of managing high-speed communications and operation of any general computing system needed for eyewear device 100. High-speed processor 932 includes processing resources needed for managing high-speed data transfers on high-speed wireless connection 937 to a wireless local area network (WLAN) using high-speed wireless circuitry 936. In certain embodiments, the high-speed processor 932 executes an operating system such as a LINUX operating system or other such operating system of the eyewear device 100 and the operating system is stored in memory 934 for execution. In addition to any other responsibilities, the high-speed processor 932 executing a software architecture for the eyewear device 100 is used to manage data transfers with high-speed wireless circuitry 936. In certain embodiments, high-speed wireless circuitry 936 is configured to implement Institute of Electrical and Electronic Engineers (IEEE) 802.11 communication standards, also referred to herein as Wi-Fi. In other embodiments, other high-speed communications standards may be implemented by high-speed wireless circuitry 936.

Low-power wireless circuitry 924 and the high-speed wireless circuitry 936 of the eyewear device 100 can include short range transceivers (Bluetooth™) and wireless wide, local, or wide area network transceivers (e.g., cellular or WiFi). Mobile device 990, including the transceivers communicating via the low-power wireless connection 925 and high-speed wireless connection 937, may be implemented using details of the architecture of the eyewear device 100, as can other elements of network 995.

Memory 934 includes any storage device capable of storing various data and applications, including, among other things, camera data generated by the left and right visible light cameras 114A-B and the image processor 912, as well as images generated for display by the image display driver 942 on the image displays of the optical assembly 180A-B. While memory 934 is shown as integrated with high-speed circuitry 930, in other embodiments, memory 934 may be an independent standalone element of the eyewear device 100. In certain such embodiments, electrical routing lines may provide a connection through a chip that includes the high-speed processor 932 from the image processor 912 or low-power processor 922 to the memory 934. In other embodiments, the high-speed processor 932 may manage addressing of memory 934 such that the low-power processor 922 will boot the high-speed processor 932 any time that a read or write operation involving memory 934 is needed.

Server system 998 may be one or more computing devices as part of a service or network computing system, for example, that include a processor, a memory, and network communication interface to communicate over the network 995 with the mobile device 990 and eyewear device 100. Eyewear device 100 is connected with a host computer. For example, the eyewear device 100 is paired with the mobile device 990 via the high-speed wireless connection 937 or connected to the server system 998 via the network 995.

Output components of the eyewear device 100 include visual components, such as the left and right image displays of optical assembly 180A-B as described in FIGS. 2C-D (e.g., a display such as a liquid crystal display (LCD), a plasma display panel (PDP), a light emitting diode (LED) display, a projector, or a waveguide). The image displays of the optical assembly 180A-B are driven by the image display driver 942. The output components of the eyewear device 100 further include acoustic components (e.g., speakers), haptic components (e.g., a vibratory motor), other signal generators, and so forth. The input components of the eyewear device 100, the mobile device 990, and server system 998, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Eyewear device 100 may optionally include additional peripheral device elements. Such peripheral device elements may include biometric sensors, additional sensors, or display elements integrated with eyewear device 100. For example, peripheral device elements may include any I/O components including output components, motion components, position components, or any other such elements described herein.

For example, the biometric components of the user interface field of view adjustment 900 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 925 and 937 from the mobile device 990 via the low-power wireless circuitry 924 or high-speed wireless circuitry 936.

FIG. 9B is a high-level functional block diagram of an example user interface field of view adjustment system 900, which is very similar to FIG. 9A, but utilizes the head movement tracker 109 instead of the eye movement tracker 213. In the example, the head movement tracker 109 includes an inertial measurement unit (IMU). Memory 934 includes an initial head direction measurements 951X-Z which correspond to principal axes measurements on the horizontal axis (X axis), vertical axis (Y axis), and depth or distance axis (Z axis) as measured by the head movement tracker 109. In certain applications of IMUs, the principal axes are referred to as pitch, roll, and yaw axes. Memory 934 also includes successive head direction measurements 961X-Z. Memory 934 further includes head movement tracking programming 946 to perform the functions described herein, including the user interface field of view adjustment interactions with the displayed content presented on left and right image displays of optical assembly 180A-B.

Head movement tracking programming 946 implements the user interface field of view adjustment instructions, including, to cause the eyewear device 100 to track, via the head movement tracker 109, the head movement of the head of the user of the eyewear device 100. Other implemented instructions cause the eyewear device 100 to determine, a field of view adjustment to the initial field of view of an initial displayed image based on the detected head movement of the user corresponding to a successive head direction. Further instructions generate a successive displayed image of the sequence of displayed images based on the field of view adjustment. The successive displayed image is produced as visible output to the user via the user interface. This visible output appears on the left and right image displays of optical assembly 180A-B, which is driven by image display driver 942 to present the sequence of displayed images, including the initial displayed image with the initial field of view and the successive displayed image with the successive field of view.

Head movement tracking programing 946 includes instructions to after presenting, via the image display, the successive displayed image, detect fixation of the head of the user of the eyewear device 100 by measuring, via the head movement tracker 109 (inertial measurement unit), an updated head direction on a horizontal axis, a vertical axis, or a combination thereof during presentation of the successive displayed image corresponding to an updated head direction. Fixation of the head is further detected by determining the updated head direction is within a deviation angle threshold of the initial head direction on the horizontal axis, the vertical axis, or the combination thereof to indicate negligible head movement of the user thereby indicating fixation.

Head movement tracking programing 946 includes instructions to in response to detecting fixation of the head of the user of the eyewear device 10, continuing to present, via the image display of the optical assembly 180A-B, the successive displayed image. The instruction of detecting fixation of the head of the user of the eyewear device 100 further includes determining a time variation between an initial time occurring at time of measurement of the initial head direction and an updated time occurring at time of measurement of the updated head direction. Head movement tracking programming 946 further includes instructions to configure the eyewear device 100 to response to determining that the time variation exceeds a deviation time threshold thereby indicating the user of the eyewear device is idle, power down the eyewear device. A flowchart of functions which can be implemented in the head movement tracking programing 946 is outlined in FIG. 13.

Figure 10A:
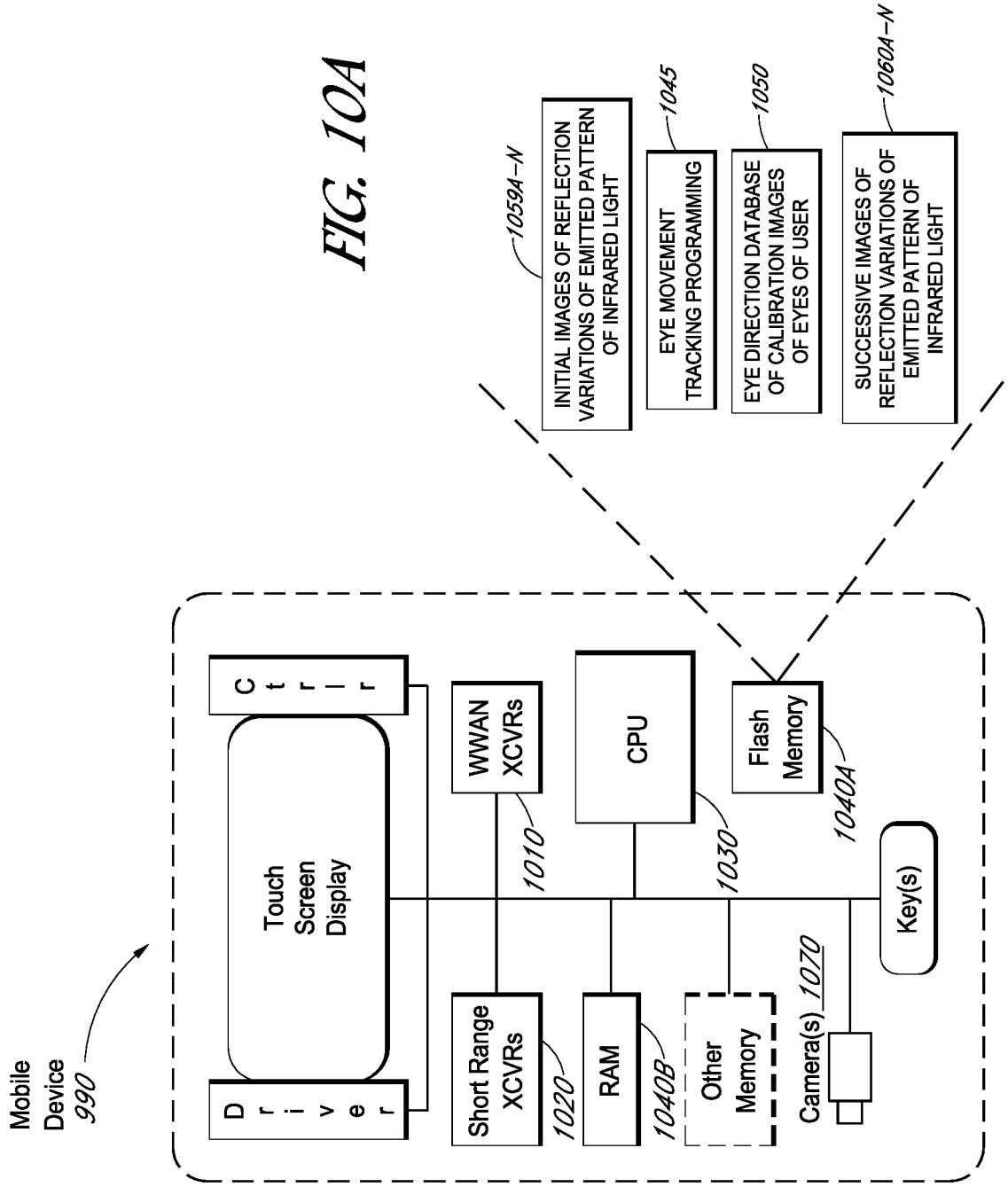
FIG. 10A shows an example of a hardware configuration for the mobile device of the user interface field of view adjustment system of FIG. 9A, based on detected eye movement, in simplified block diagram form.

FIG. 10A is a high-level functional block diagram of an example of a mobile device 990 that communicates via the eye movement based user interface field of view adjustment system 900 of FIG. 9A. FIG. 10B is very similar to FIG. 10A, but is a block diagram for a mobile device 990 that communicates via the head movement based user interface field of view adjustment system 900 of FIG. 9B.

In FIG. 10A, flash memory 1040A includes an eye direction database of calibrated images of eyes of the user 1050 that are captured during the calibration procedure of the eye movement tracker 213. Flash memory 1040A further includes initial images of reflection variations of the emitted pattern of infrared light 1059A-N and successive images of reflection variations of emitted pattern of infrared light 1060A-N. Flash memory 1040A further includes eye movement tracking programming 1045 to perform the functions described herein, including the user interface field of view adjustment interactions with the displayed content presented on left and right image displays of optical assembly 180A-B. In other examples, the user interface field of view adjustments can be utilized to generate displayed images presented on the touch screen display of the mobile device 990, for example, when the mobile device 990 includes components like the eyewear device 100, including the eye movement tracker 213.

With further reference to FIG. 10A, eye movement tracking programming 1045 implements the user interface field of view adjustment instructions, including, to cause the eyewear device 100 to track, via the eye movement tracker 213, the eye movement of the eye of the user of the eyewear device 100. Other implemented instructions (functions) cause the eyewear device 100 to determine, a field of view adjustment to the initial field of view of an initial displayed image based on the detected eye movement of the user corresponding to a successive eye direction. Further functions generate a successive displayed image of the sequence of displayed images based on the field of view adjustment. The successive displayed image is produced as visible output to the user via the user interface. This visible output appears on the image display of optical assembly 180A-B, which is driven by image display driver 942 to present the sequence of displayed images, including the initial displayed image with the initial field of view and the successive displayed image with the successive field of view. In other examples, when the mobile device 990 includes components like the eyewear device 100, including the eye movement tracker 213, the visible output can appear on the touch screen display of mobile device 990, which is driven by the depicted driver and controller of FIG. 10A.

In FIG. 10B, flash memory 1040A includes an initial head direction measurements 1051X-Z which correspond to principal axes measurements on the horizontal axis (X axis), vertical axis (Y axis), and depth or distance axis (Z axis) as measured by the head movement tracker 109. Flash memory 1040A also includes successive head direction measurements 1061X-Z. Flash memory 1040A further includes head movement tracking programming 1046 to perform the functions described herein, including the user interface field of view adjustment interactions with the displayed content presented on left and right image displays of optical assembly 180A-B. In other examples, the user interface field of view adjustments can be utilized to generate displayed images presented on the touch screen display of the mobile device 990, for example, when the mobile device 990 includes components like the eyewear device 100, including the head movement tracker 109.

With further reference to FIG. 10B, head movement tracking programming 1046 implements the user interface field of view adjustment instructions, including, to cause the eyewear device 100 to track, via the head movement tracker 109, the head movement of the head of the user of the eyewear device 100. Other implemented instructions cause the eyewear device 100 to determine, a field of view adjustment to the initial field of view of an initial displayed image based on the detected head movement of the user corresponding to a successive head direction. Further functions generate a successive displayed image of the sequence of displayed images based on the field of view adjustment. The successive displayed image is produced as visible output to the user via the user interface. This visible output appears on the image display of optical assembly 180A-B, which is driven by image display driver 942 to present the sequence of displayed images, including the initial displayed image with the initial field of view and the successive displayed image with the successive field of view. In other examples, when the mobile device 990 includes components like the eyewear device 100, including the head movement tracker 109, the visible output appears on the touch screen display of mobile device 990, which is driven by the depicted driver and controller of FIG. 10B.

Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIGS. 10A-B therefore provide block diagram illustrations of the example mobile device 990 having a touch screen display for displaying content and receiving user input as (or as part of) the user interface. Mobile device 990 also includes a camera(s) 1070, such as visible light camera(s).

The activities that are the focus of discussions here typically involve data communications related to eye movement or head movement tracking for determining field of view adjustments to displayed images in a portable eyewear device 100. As shown in FIG. 10, the mobile device 990 includes at least one digital transceiver (XCVR) 1010, shown as WWAN XCVRs, for digital wireless communications via a wide area wireless mobile communication network. The mobile device 990 also includes additional digital or analog transceivers, such as short range XCVRs 1020 for short-range network communication, such as via NFC, VLC, DECT, ZigBee, Bluetooth™, or WiFi. For example, short range XCVRs 1020 may take the form of any available two-way wireless local area network (WLAN) transceiver of a type that is compatible with one or more standard protocols of communication implemented in wireless local area networks, such as one of the Wi-Fi standards under IEEE 802.11 and WiMAX.

To generate location coordinates for positioning of the mobile device 990, the mobile device 990 can include a global positioning system (GPS) receiver. Alternatively, or additionally the mobile device 990 can utilize either or both the short range XCVRs 1020 and WWAN XCVRs 1010 for generating location coordinates for positioning. For example, cellular network, WiFi, or Bluetooth™ based positioning systems can generate very accurate location coordinates, particularly when used in combination. Such location coordinates can be transmitted to the eyewear device over one or more network connections via XCVRs 1020.

The transceivers 1010, 1020 (network communication interface) conforms to one or more of the various digital wireless communication standards utilized by modern mobile networks. Examples of WWAN transceivers 1010 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 1010, 1020 provide two-way wireless communication of information including digitized audio signals, still image and video signals, web page information for display as well as web related inputs, and various types of mobile message communications to/from the mobile device 990 for user interface field of view adjustment.

Several of these types of communications through the transceivers 1010, 1020 and a network, as discussed previously, relate to protocols and procedures in support of communications with the eyewear device 100 or the server system 998 for tracking head movement or eye movement for user interface field of view adjustment. Such communications, for example, may transport packet data via the short range XCVRs 1020 over the wireless connections 925 and 937 to and from the eyewear device 100 as shown in FIGS. 9A-B. Such communications, for example, may also transport data utilizing IP packet data transport via the WWAN XCVRs 1010 over the network (e.g., Internet) 995 shown in FIGS. 9A-B. Both WWAN XCVRs 1010 and short range XCVRs 1020 connect through radio frequency (RF) send-and-receive amplifiers (not shown) to an associated antenna (not shown).

The mobile device 990 further includes a microprocessor, shown as CPU 1030, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 1030, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 1030 or processor hardware in smartphone, laptop computer, and tablet.

The microprocessor 1030 serves as a programmable host controller for the mobile device 990 by configuring the mobile device to perform various operations, for example, in accordance with instructions or programming executable by processor 1030. For example, such operations may include various general operations of the mobile device, as well as operations related to user interface field of view adjustment and communications with the eyewear device and server system. Although a processor may be configured by use of hardwired logic, typical processors in mobile devices are general processing circuits configured by execution of programming.

The mobile device 990 includes a memory or storage device system, for storing data and programming. In the example, the memory system may include a flash memory 1040A and a random access memory (RAM) 1040B. The RAM 1040B serves as short term storage for instructions and data being handled by the processor 1030, e.g. as a working data processing memory. The flash memory 1040A typically provides longer term storage.

Hence, in the example of mobile device 990, the flash memory 1040A is used to store programming or instructions for execution by the processor 1030. Depending on the type of device, the mobile device 990 stores and runs a mobile operating system through which specific applications, including eye movement tracking programming 1045 or head movement tracking programming 1046. Applications, such as the eye movement tracking programming 1045 or head movement tracking programming 1046, may be a native application, a hybrid application, or a web application (e.g., a dynamic web page executed by a web browser) that runs on mobile device 990 to provide user interface field of view adjustment. Examples of mobile operating systems include Google Android, Apple iOS (I-Phone or iPad devices), Windows Mobile, Amazon Fire OS, RIM BlackBerry operating system, or the like.

It will be understood that the mobile device 990 is just one type of host computer in the user interface field of view adjustment system 900 and that other arrangement may be utilized. For example, a server system such as that shown in FIGS. 9A-B may host the eye direction database of calibration images of eyes of user 1050 and perform the comparison to make the user interface field of view adjustment. Where the eye direction database of calibration images of eyes of user 1050 and images of reflection variations of the emitted pattern of infrared light are stored and processed can vary depending on the security preferences of the user and the system requirements.

Figure 11A:
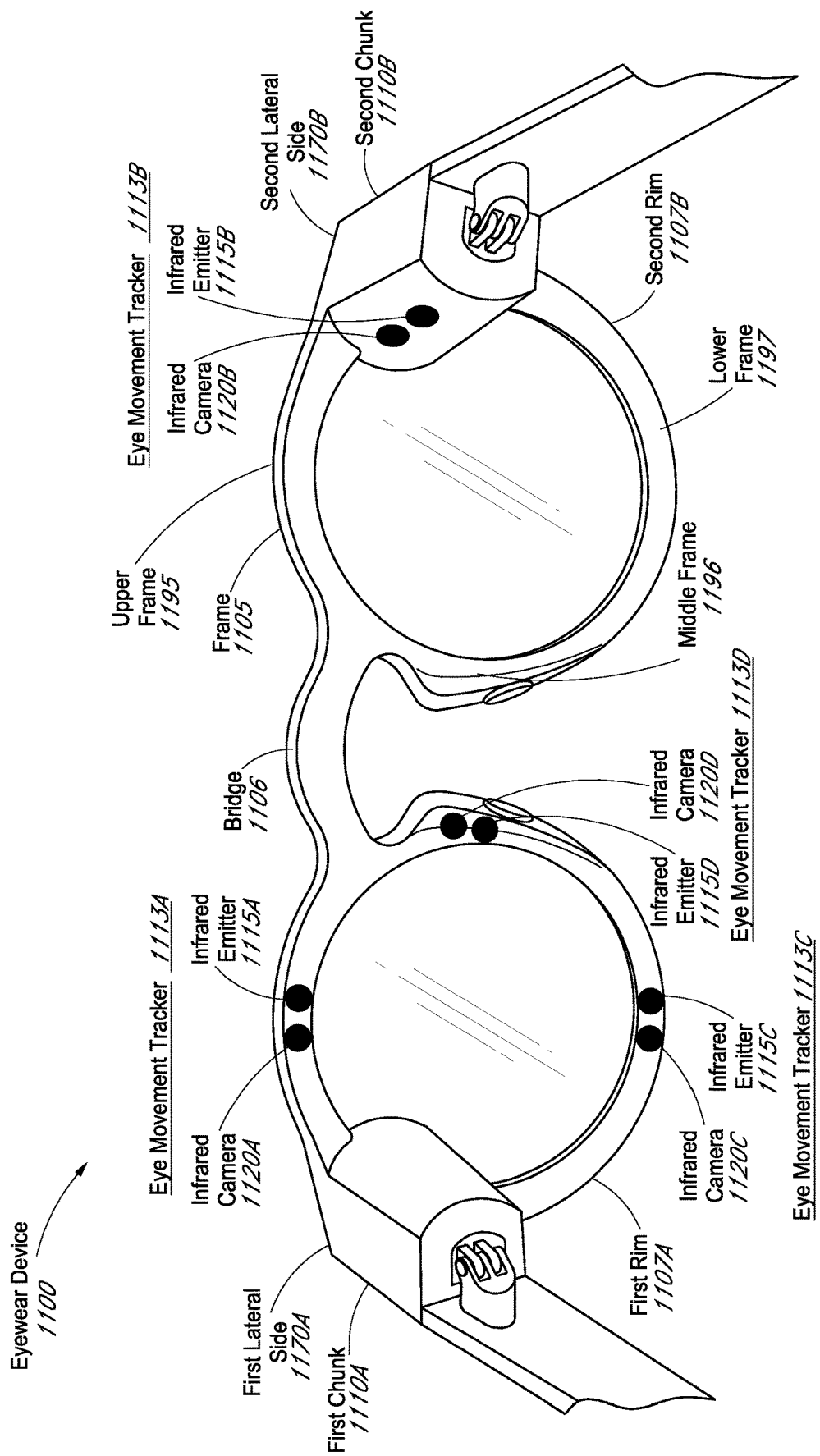
FIG. 11A shows various alternate locations for the eye movement tracker on the eyewear device, which can be used individually or in combination.

FIG. 11A shows various alternate locations for the eye movement tracker on the eyewear device, which can be used individually or in combination. A shown, multiple eye movement trackers 1113A-D can be included in the eyewear device 1100 to reduce errors in tracking eye movement of the user, e.g., to determine a direction in which the user is looking (e.g., line of sight) for eye tracking. In the example, there a four eye movement trackers 1113A-D, and each eye movement tracker 1113A-D includes a respective infrared emitter 1115A-D and infrared camera 1120A-D.

As shown, the frame 1105 includes opposing first and second lateral sides 1170A-B. A first chunk 1110A is integrated into the first lateral side 1170A of frame 1105. A second chunk 1110B is integrated into the second lateral side 1170B of frame 1105. A circuit board (not shown) spans the first chunk 1110A, the frame 1105, and the second chunk 1110B. The frame 1105 of the eyewear device 1100 includes an upper frame portion 1195, a middle frame portion 1196, and a lower frame portion 1197.

As depicted in FIG. 11A, eye movement tracker 1113A is located on the first rim 1107A on the upper frame portion 1195. Eye movement tracker 1113B is located on the second chunk 1110B. Eye movement tracker 1113C is located on the first rim 1107A on the lower frame portion 1197. Eye movement tracker 1113D is located on the first rim on the middle frame portion 1196.

Eyewear device 1100 includes a first eye movement tracker 1113A that includes a first infrared emitter 1115A and a first infrared camera 1120A. Eyewear device 1100 also includes a second eye movement tracker 1113B that includes a second infrared emitter 1115B and a second infrared camera 1120B. The second infrared emitter 1115B is connected to the frame 1105 or the at least one chunk 1110A-B to emit a second emitted pattern of infrared light. The second infrared camera 1120B is connected to the frame 1105 or the at least one chunk 1110A-B to capture reflection variations in the second emitted pattern of infrared light. It should be understood that the first and second eye movement trackers 1113A-B can include any combination of locations, or number of eye movement trackers 1113A-D shown in FIG. 11A, including one, two, three, or four of the eye movement trackers 1113A-D. Additionally, the eye movement trackers 1113A-D can be located on other portions of the eyewear device 1100, including the first chunk 1110A; upper, middle, and lower portions 1195-1197 of the second rim 1107B; the bridge 1106, or the temples.

In an example, the eyewear device 1110 emits, via the second infrared emitter 1115B, the second emitted pattern of infrared light on a second eye of the user of the eyewear device 1110. Eyewear device 100 captures, via the second infrared camera 1120B, reflection variations in the second emitted pattern of infrared light on the second eye of the user. Based on the reflection variations of the second emitted pattern of infrared light on the second eye of the user, the system determines a direction of a line of sight of the eyes of the user for eye tracking.

In some examples, the second emitted pattern of infrared light can be the same or different from the first pattern of infrared light emitted by the first infrared emitter 1115A. The second infrared emitter 1115B and the second infrared camera 1120B can be co-located on the frame 1105 or the at least one chunk 1110A-B as shown in FIG. 11. Although not shown in FIG. 11A, the first infrared emitter 1115A and the infrared camera 1120A can be co-located on a first chunk 1110A. The second infrared emitter 1115B and the second infrared camera 1120B can be co-located on a second chunk 1110B.

As described and depicted in FIG. 2A and shown in FIG. 11A, the frame 1105 of the eyewear device 1100 includes first and second eye rims 1107A-B that have respective apertures to hold a respective optical element and the first and second eye rims 1107A-B are connected by a bridge 1106. In an example, the first infrared emitter 1115A and the first infrared camera 1120A are co-located on the first eye rim 1107A. Although not shown in FIG. 11B, the second infrared emitter 1115B and the second infrared camera 1120B can be co-located on the second eye rim 1107B, including on the upper frame portion 1195, middle frame portion 1196, and lower frame portion 1197.

Figure 11D:
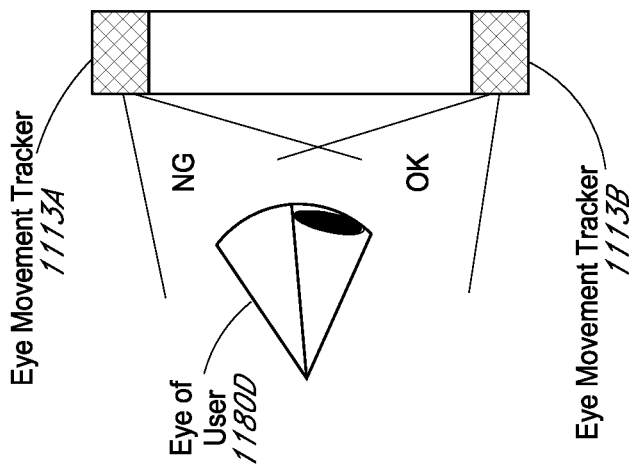
FIGS. 11B, 11C, and 11D illustrate the effects of the various alternate locations on the eye movement tracker on the eyewear device with respect to different orientations of the eye of the user.
Figure 11C:
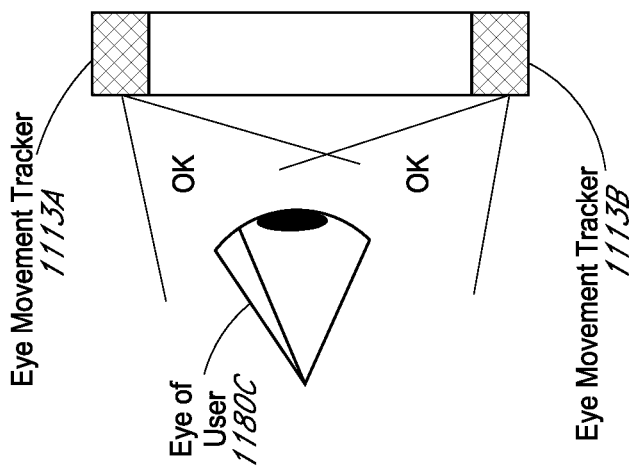
Figure 11B:
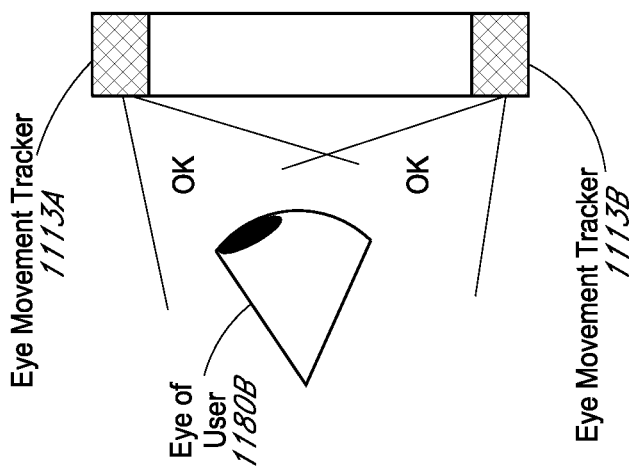

FIGS. 11B-D illustrate the effects of the various alternate locations on the eyewear device with respect to different orientations of the eye of the user. In FIG. 11B, the eye of the user 1180B is looking up. Accordingly, placement of the eye movement tracker 1113A, such as the infrared emitter and infrared camera, on either the upper frame portion (e.g., top frame on the rims, bridge, etc.) or a chunk can accurately capture an image of the retina or iris of the eye of the user 1180B looking up. Also, placement of the eye movement tracker 1113B on a lower frame portion (e.g., bottom frame) of the eyewear device also accurately captures an image of the retina or iris of the eye of the user 1180B looking up. Hence both fields of view are depicted as suitable (OK).

In FIG. 11C, the eye of the user 1180C is looking straight ahead. In this scenario, again placement of the eye movement tracker 1113A on either the upper frame portion or a chunk can accurately capture an image of the retina or iris of the eye of the user 1180C looking straight ahead. Also, placement of the eye movement tracker 1113B on the lower frame portion of the eyewear device accurately captures an image of the retina or iris of the eye of the user 1180C looking straight ahead.

In FIG. 11D, the eye of the user 1180D is looking down. In this orientation of the eye of the user 1180D, placement of the eye movement tracker 1113A, on either the upper frame portion or a chunk may be insufficient because the eyelid of the user 1180D can block the infrared camera. Hence the field of view is depicted as not good (NG). However, placement of the eye movement tracker 1113B on the lower frame portion of the eyewear device can accurately capture an image of the retina or iris of the eye of the user 1180D looking down. Thus, having multiple eye movement trackers 1113A-B on the eyewear device can improve performance of the user interface field of view adjustment system by improving accuracy and reducing errors in eye movement tracking. Multiple eye movement trackers 1113A-B eye tracking directional information by more accurately detecting the eye direction where the user is looking (left, right, up, down, east, west, north, south, etc.).

Figure 13:
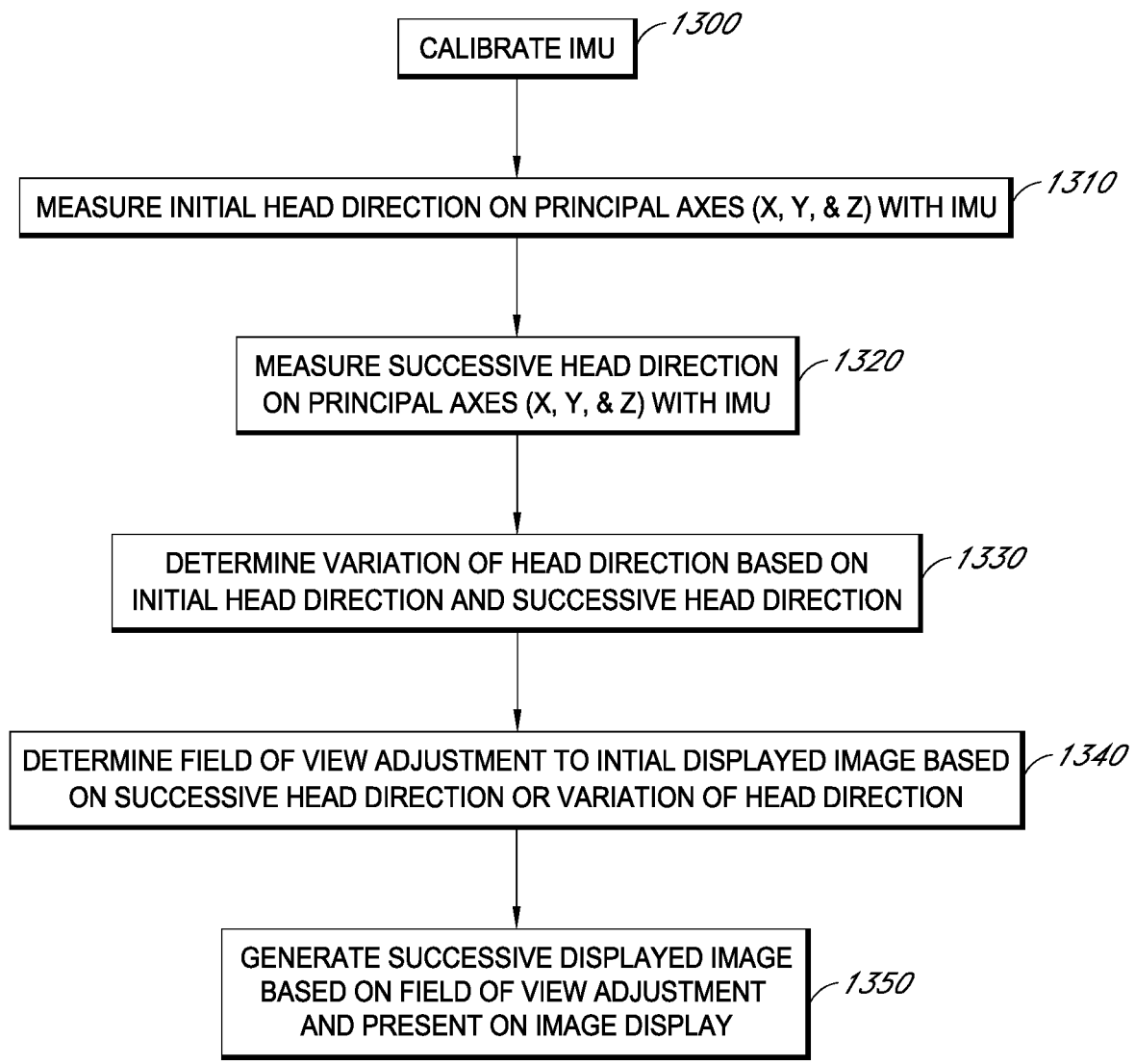
FIG. 13 is a flowchart of the operation of the eyewear device to implement user interface field of view adjustments utilizing the head movement tracker.

FIG. 12 is a flowchart of the operation of the eyewear device 100 to implement user interface field of view adjustments utilizing the eye movement tracker 213. FIG. 13 is a flowchart of the operation of the eyewear device 100 to implement user interface field of view adjustments utilizing the head movement tracker 109. Because the blocks of FIGS. 12-13 were already explained in detail previously, repetition is avoided here.

FIG. 14A illustrates an example of an initial displayed image 1405A that includes three-dimensional animated characters 1407A-B. Besides three-dimensional characters, display images presented on the image display of optical assembly 180A-B described herein can include many different types of various three-dimensional graphical objects. In some examples, three dimensional objects can include a bitmoji, an application icon (e.g., for a phone application), weather information, or a picture. Returning to the example of FIG. 14A, an initial field of view 1406A of the initial displayed image 1405A includes a left animated character 1407A and a center animated character 1407B in the observable visual area and angle of view. However, the initial field of view 1406A corresponding to the initial head direction or initial eye direction has a right animated character 1407C outside of the observable visual area and angle of view. Thus, the right animated character 1407C does not appear in the initial displayed image 1405A.

Figure 14B:
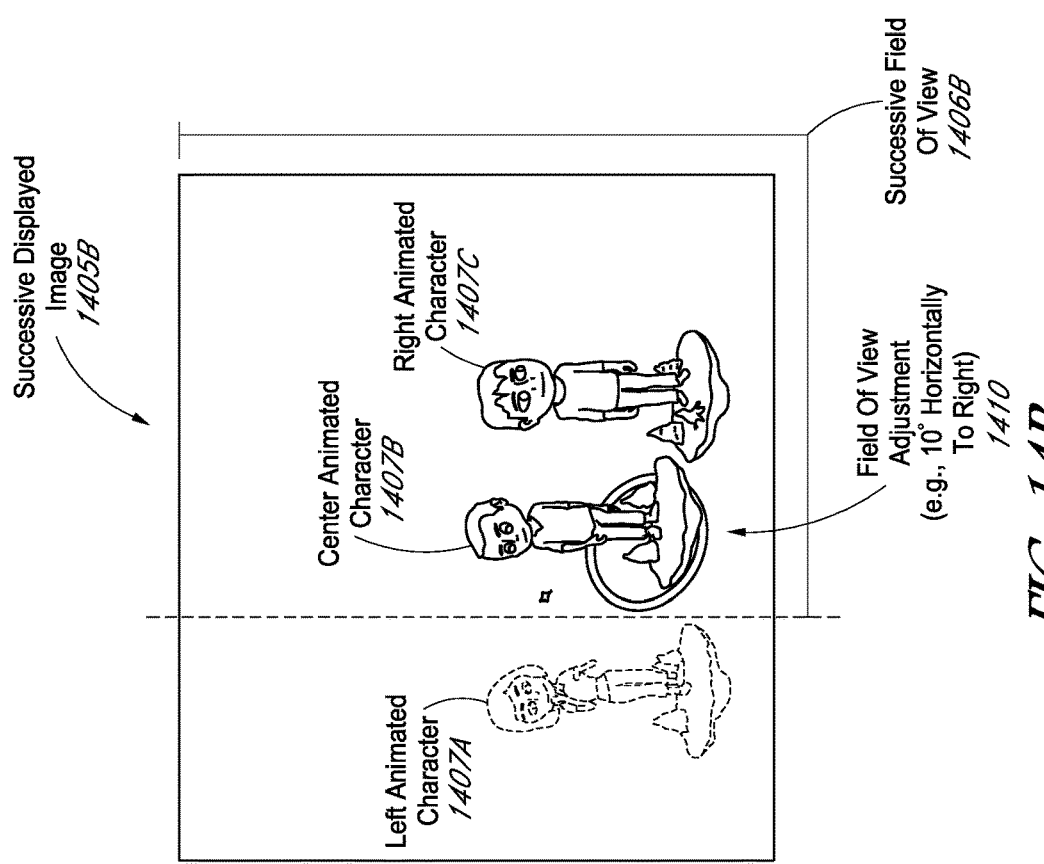
FIG. 14B illustrates an example of a successive displayed image that includes different three-dimensional animated characters than FIG. 14A because of a field of view adjustment resulting from right horizontal eye movement.
Figure 14A:
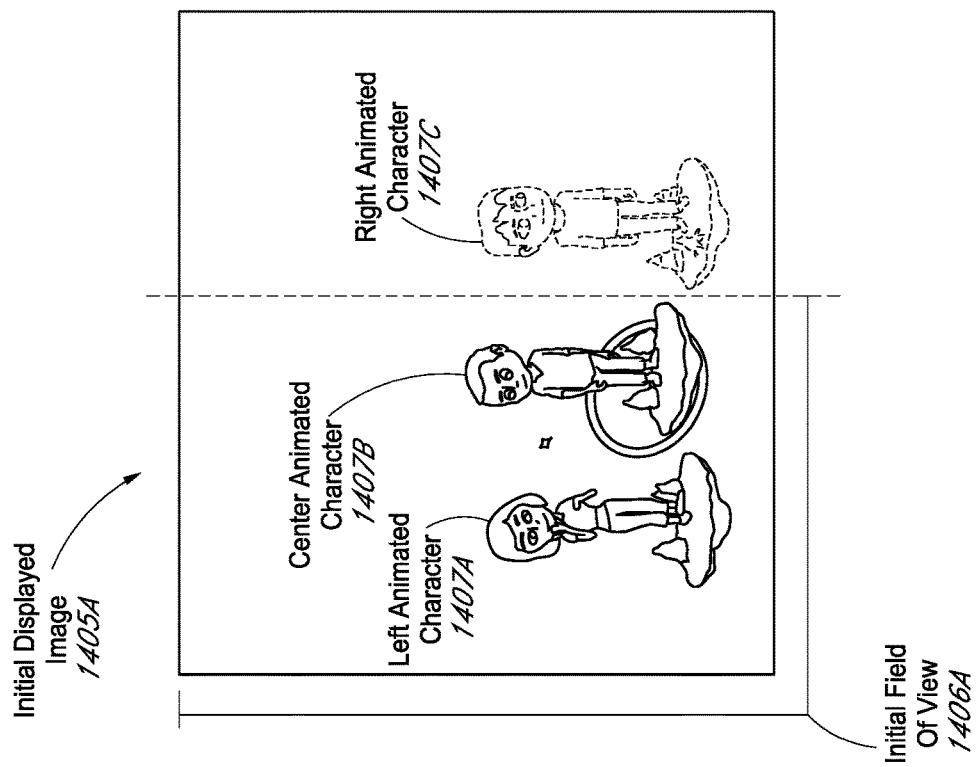
FIG. 14A illustrates an example of an initial displayed image that includes three-dimensional animated characters.

FIG. 14B illustrates an example of a successive displayed image 1405B that includes different three-dimensional animated characters 1406B-C than FIG. 14A. Successive field of view 1406B of the successive displayed image 1405B includes a center animated character 1407B and a right animated character 1407C. However, the successive field of view 1406B corresponding to the successive head direction or successive eye direction has a left animated character 1407A outside of the observable visual area and angle of view. Because the field of view adjustment 1410 is horizontally to the right (e.g., by about 10°), the left animated character 1407A does not appear in the successive displayed image 1405B. Angles associated with detected eye movement or head movement can vary, and may be between 2° to 15° horizontally or vertically, for example.

In FIG. 14B, field of view adjustment 1405 renders visible (e.g., unhides) a first three-dimensional graphical object (e.g., right animated character 1407C) which was not visible during the initial displayed image 1405A. The first three-dimensional graphical object (e.g., right animated character 1407C) is overlaid on a background scene of the successive displayed image 1405B. Field of view adjustment 1410 renders invisible (e.g., hides) a second three-dimensional graphical object (e.g., left animated character 1407A) which was visible during the initial displayed image 1405A. The second three-dimensional graphical object (e.g., left animated character 1407A) is removed from the background scene of the successive displayed image 1405B.

FIG. 15A illustrates an example in which an animated character 1507 is outside of the observable visual area and angle of view of an initial field of view 1506A of the initial displayed image 1505A. Animated character 1507 does not appear in the initial displayed image 1405A and is off to the left peripheral side. Thus, animated character 1507 is not visible in the initial displayed image 1505A being presented on the left and right image displays of optical assembly 180A-B.

Figure 15B:
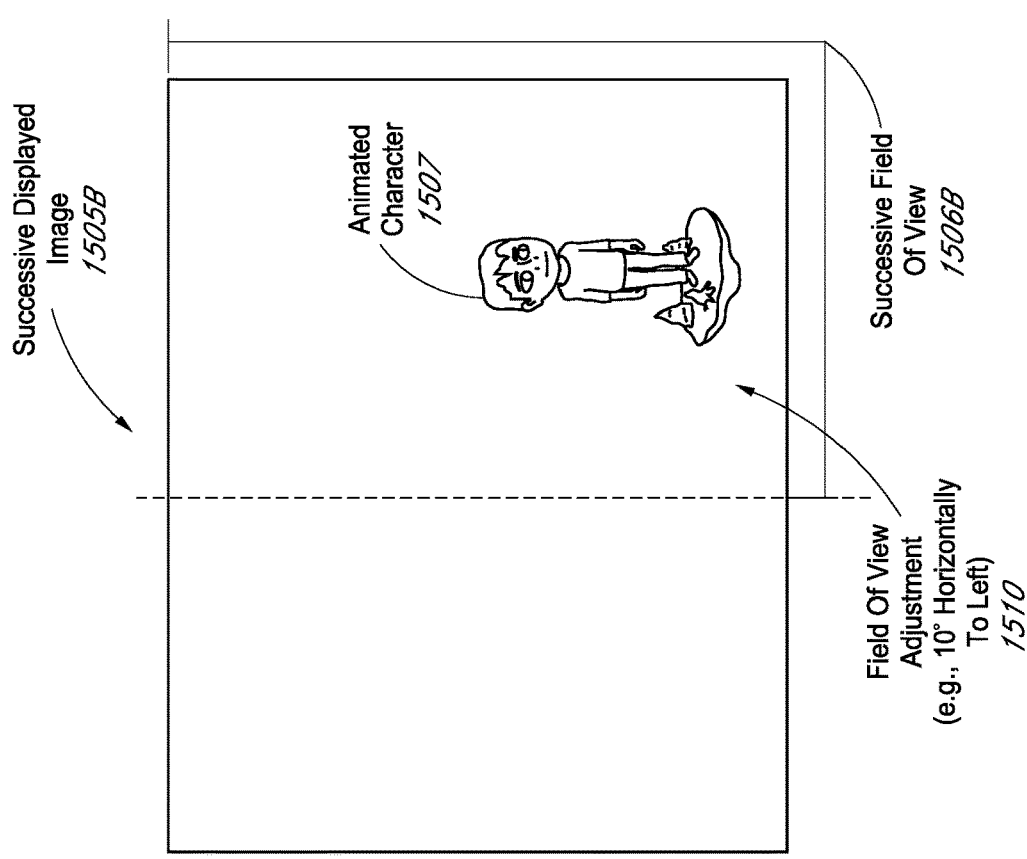
FIG. 15B illustrates an example of a successive displayed image generated based on a field of view adjustment resulting from left horizontal eye or head movement of the user wearing the eyewear device while initial displayed image of FIG. 15A is being presented.
Figure 15A:
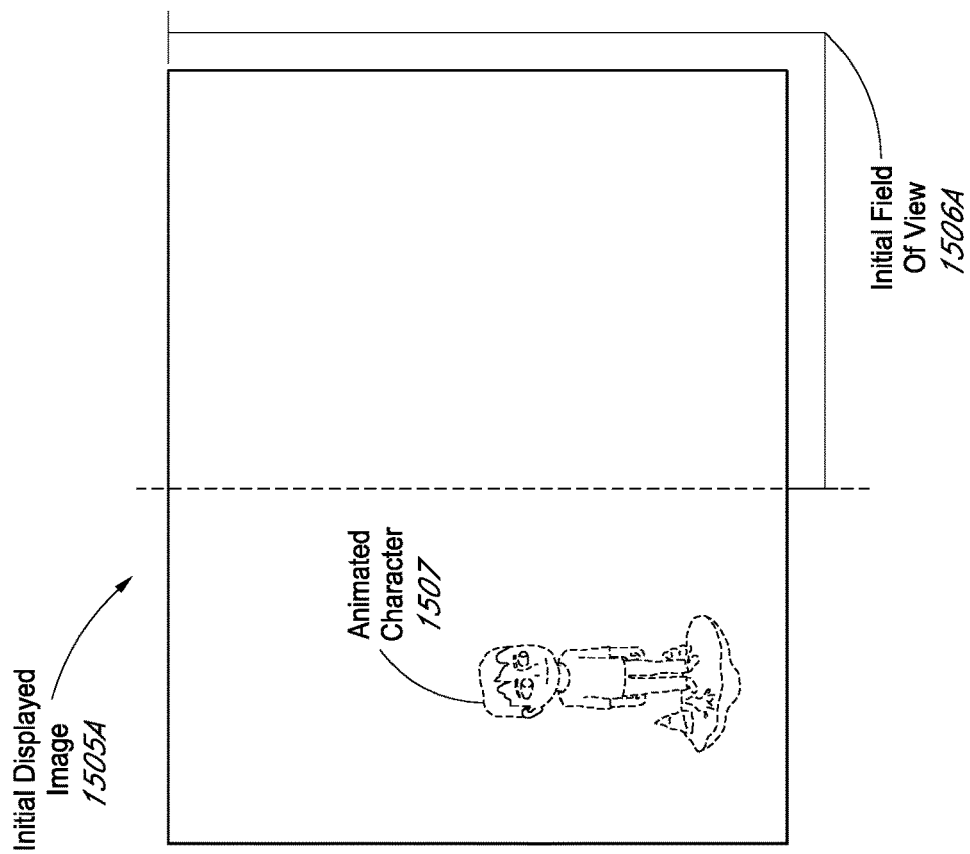
FIG. 15A illustrates an example in which an animated character is outside of the observable visual area and angle of view of an initial field of view of the initial displayed image.

FIG. 15B illustrates an example of a successive displayed image 1505B generated based on a field of view adjustment 1510 resulting from eye movement or head movement of the user while the user wears the eyewear device 100. While the initial displayed image 1505A of FIG. 15A is being presented on the left and right image displays of optical assembly 180A-B, the user moves the head or eyes horizontally to the left. In FIG. 15B, the eye movement or head movement of the user wearing the eyewear device 100 is horizontally to the left by about 10°, for example. As a result, animated character 1507 is in now in the successive field of view 1506B of the successive displayed image 1505B and thus is visible in the successive displayed image 1505B presented on the left and right image displays of optical assembly 180A-B.

FIG. 16A illustrates an example of an initial displayed image in which weather information 1607B is not in an initial field of view 1606A of the initial displayed image 1605A. However, an animated character 1607A is within the initial field of view 1606A.

Figure 16B:
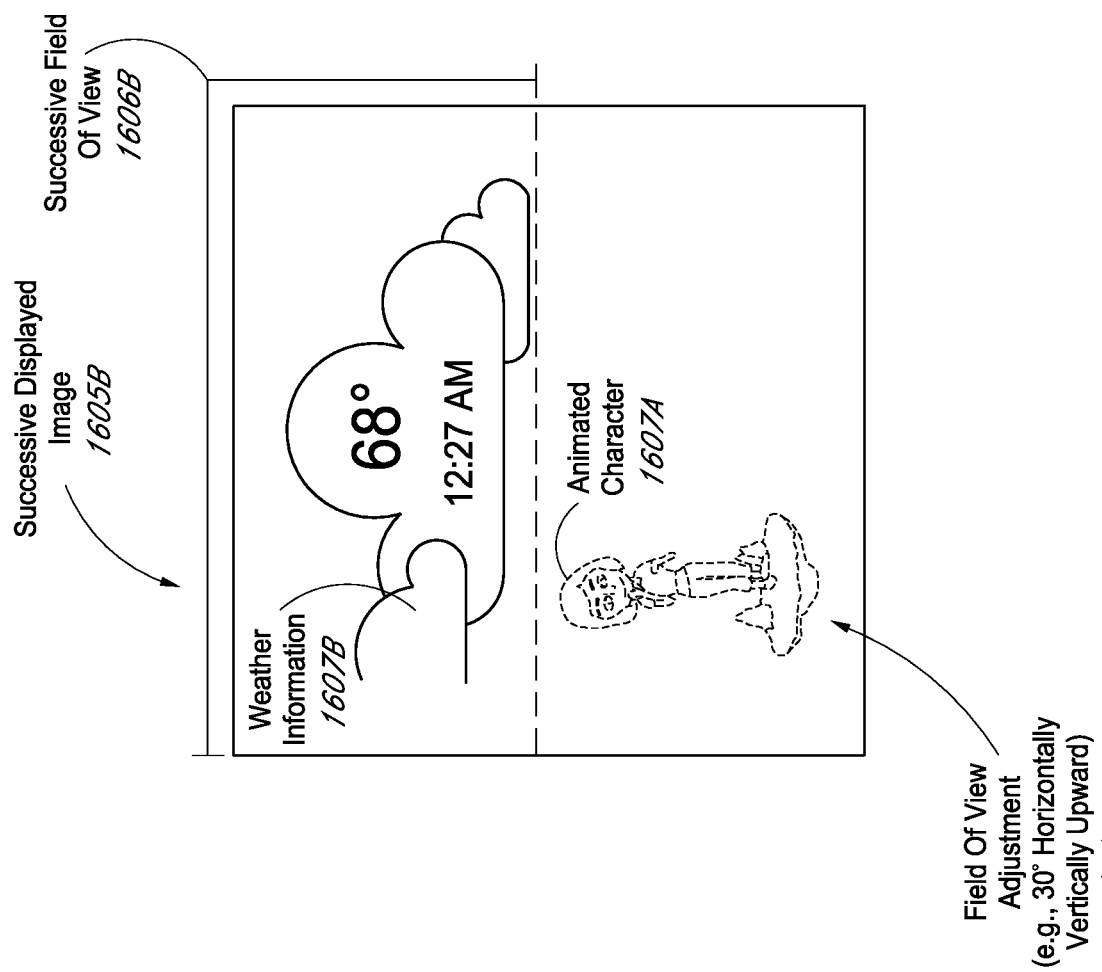
FIG. 16B illustrates another example of a successive displayed image generated based on a field of view adjustment resulting from upwards vertical head or eye movement while initial displayed image of FIG. 16A is being presented.
Figure 16A:
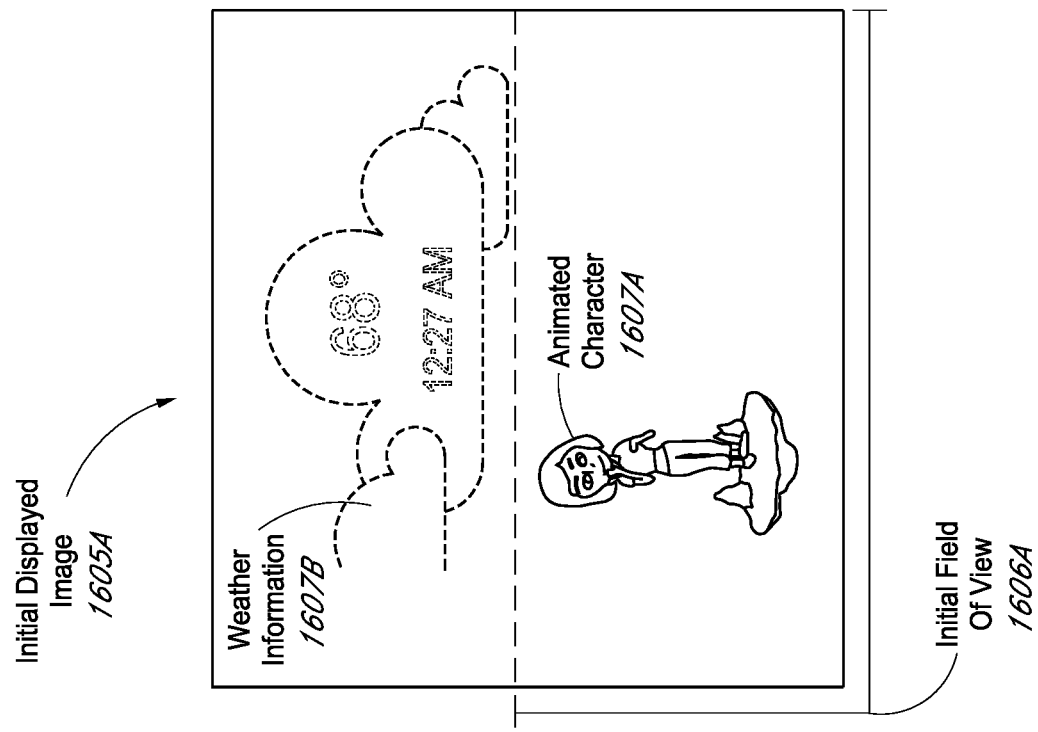
FIG. 16A illustrates an example of an initial displayed image in which weather information is outside of the observable visual area and angle of view of an initial field of view of the initial displayed image.
Figure 17A:
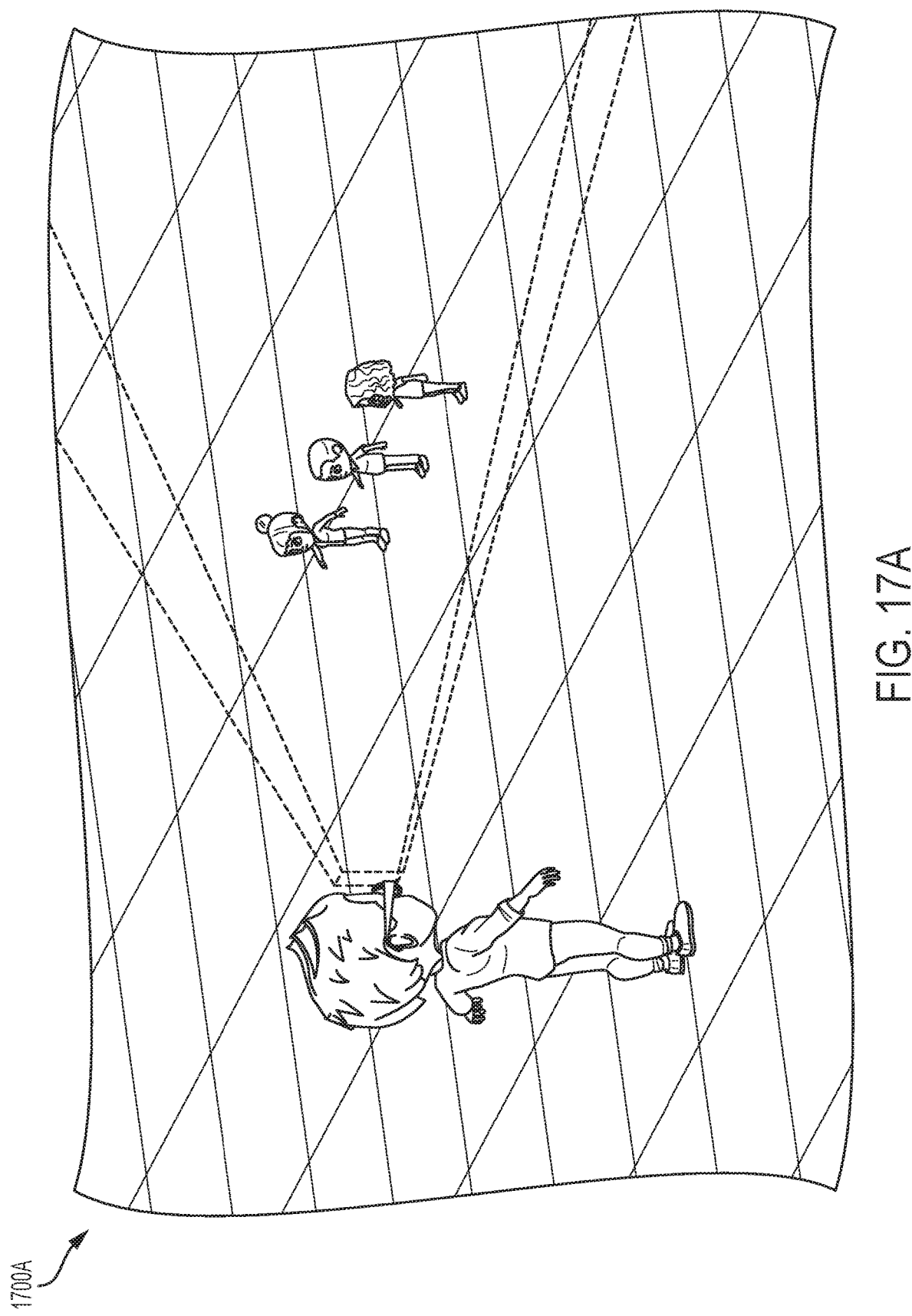
FIGS. 17A-D illustrate schematic views of displayed images being generated based on a field of view adjustment.
Figure 17B:
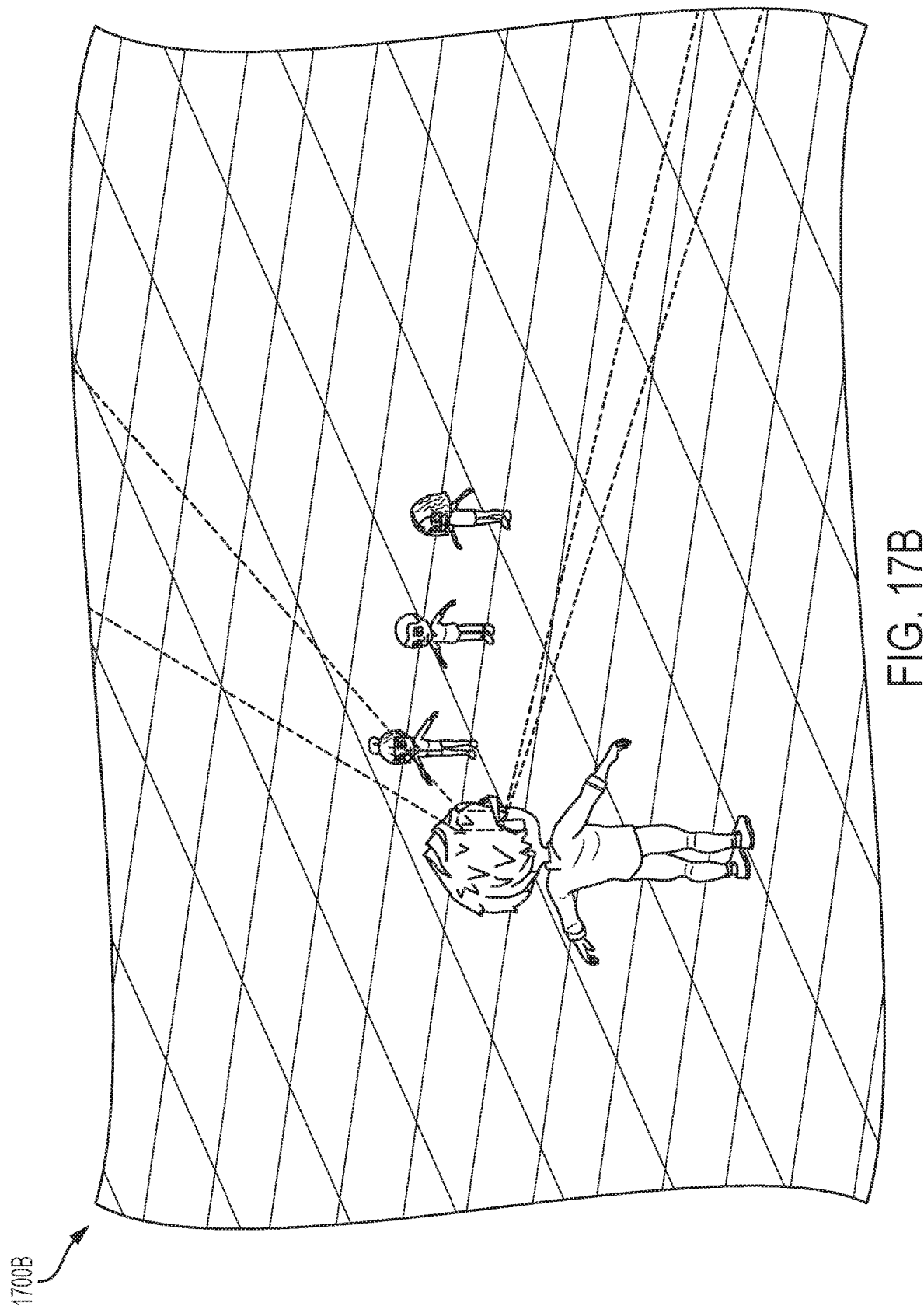
Figure 17C:
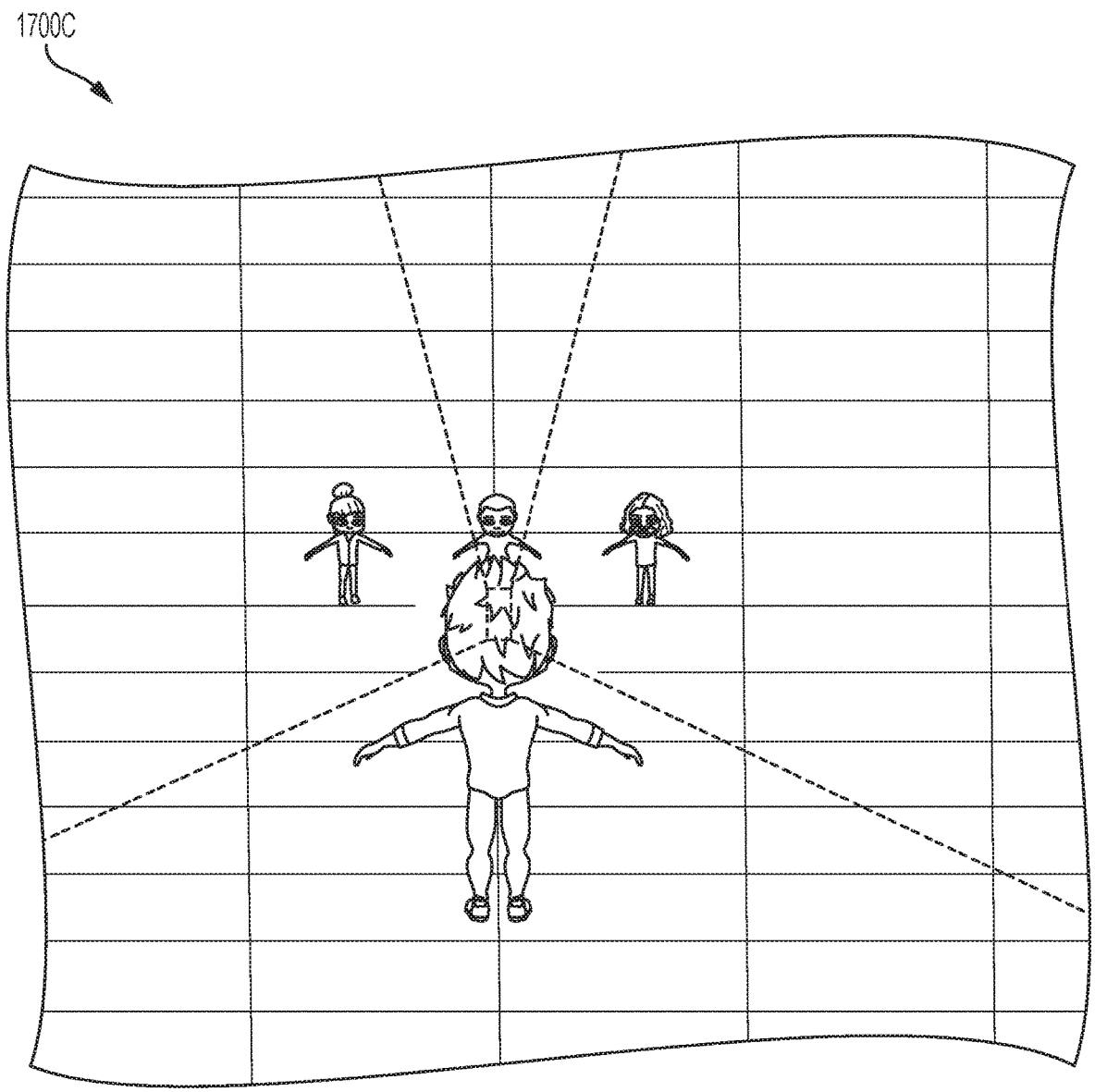
Figure 17D:
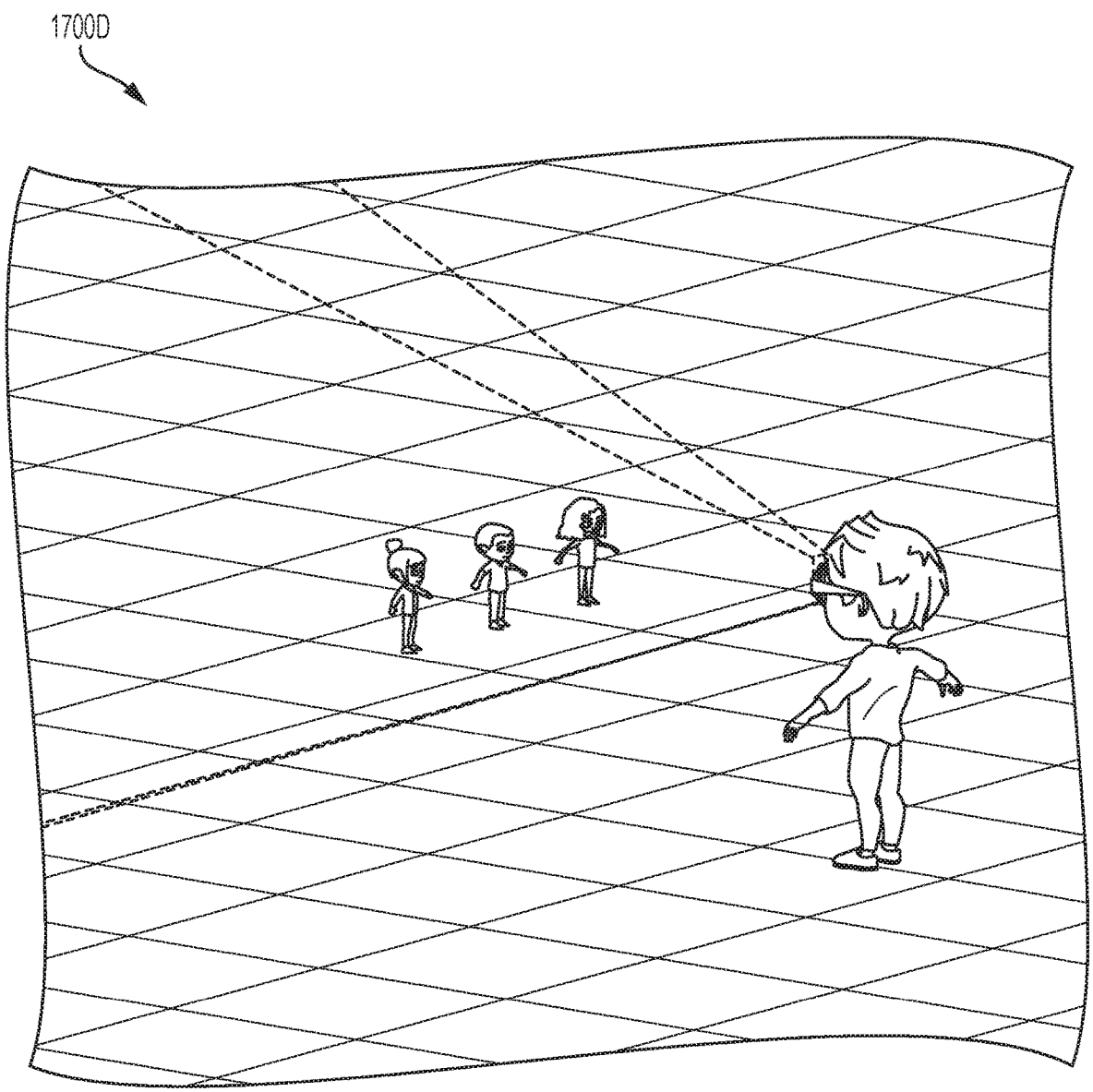

FIG. 16B illustrates another example of a successive displayed image 1606B generated based on a field of view adjustment 1610 to the initial displayed image of FIG. 16A. As shown, the weather information 1607B is in a successive field of view 1606B of the successive displayed image 1605B. In FIG. 16B, the eye movement or head movement of the user wearing the eyewear device 100 is vertically upwards by about 30°, for example. Consequently, animated character 1607A is not visible in the successive field of view 1606B. But weather information 1607B is within the observable visual area and angle of view of the successive field of view 1606B and is presented in the successive displayed image 1605B on the left and right image displays of optical assembly 180A-B.

In the foregoing examples of three-dimensional imaging, left (first) and right (second) images are presented on the left (first) and right (second) image displays of optical assembly 180A-B are combined to provide a three-dimensional interaction with the eyewear device 100. For example, in FIG. 16A-B the initial displayed image 1605A can be divided into a first initial displayed image having a first initial field of view and a second initial displayed image having a second initial field of view for presentation on respective first and second image displays of the optical assembly 180A-B. The determined field of view adjustment 1610 can include a first field of view adjustment to the first initial field of view of the first initial displayed image and a second field of view adjustment to the second initial field of view of the second initial displayed image. Similarly, the successive displayed image 1605B can be divided into a first successive displayed image generated based on the first field of view adjustment and a second successive displayed image generated based on the second field of view adjustment for presentation on the respective first and second image displays of the optical assembly 180A-B. The first successive displayed image and the second successive displayed image partially overlap. The first successive displayed image has a first successive field of view and the second successive displayed image has a second successive field of view. The first successive field of view and the second successive field of view partially overlap and when stitched together generate the successive field of view 1606B of the successive image 1605B.

FIGS. 17A-D illustrate schematic views 1700A-D of displayed images being generated based on a field of view adjustment. In FIGS. 17A-D, the user is gazing at a three-dimensional interface presented on the image display of optical assembly 180A-B of the eyewear device 100. As shown, a user is standing, and views three small bitmoji type animated character figures in front of him, and looks in different directions between the animated character figures to select between the three different bitmoijs, which are then presented in a displayed image.

Any of the user interface field of view adjustment functionality described herein for the eyewear device 100, mobile device 990, and server system 998 can be embodied in one more applications as described previously. According to some embodiments, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An eyewear device including:
    a frame including a bridge;
    a temple connected to a lateral side of the frame;
    a head movement tracker or an eye movement tracker;
    first and second image displays for presenting a sequence of displayed images;
    first and second apertures which respectively hold the first and second image displays;
    an image display driver coupled to the first and second image displays to control the first and second image displays to present the sequence of displayed images;
    a memory;
    a processor having access to the image display driver and the memory; and
    programming in the memory, wherein execution of the programming by the processor configures the eyewear device to perform functions, including functions to:
    present, via the first and second image displays, an initial displayed image of the sequence of displayed images, the initial displayed image having an initial field of view corresponding to an initial head direction or an initial eye direction;
    detect movement of a user of the eyewear device by:
        tracking, via the head movement tracker, a head movement of a head of the user, or
        tracking, via the eye movement tracker, an eye movement of an eye of the user of the eyewear device;
    determine, a field of view adjustment to the initial field of view of the initial displayed image based on the detected movement of the user, wherein the field of view adjustment includes a successive field of view corresponding to a successive head direction or a successive eye direction;
    generate a successive displayed image of the sequence of displayed images based on the field of view adjustment; and
    present, via the first and second image displays, the successive displayed image, the successive displayed image having the successive field of view representing a combined three-dimensional observable area visible through stitching together of two displayed images having different fields of view presented on the first and second image displays.

2. The eyewear device of claim 1, wherein:
    the successive field of view of the successive displayed image includes an angle of view between about 15° to 30° measured horizontally, vertically, or diagonally.

3. The eyewear device of claim 1, wherein:
    the initial displayed image is divided into a first initial displayed image having a first initial field of view and a second initial displayed image having a second initial field of view for presentation on the respective first and second image displays; and
    the determined field of view adjustment includes a first field of view adjustment to the first initial field of view of the first initial displayed image and a second field of view adjustment to the second initial field of view of the second initial displayed image.

4. The eyewear device of claim 3, wherein:
    the successive displayed image is divided into a first successive displayed image generated based on the first field of view adjustment and a second successive displayed image generated based on the second field of view adjustment for presentation on the respective first and second image displays;

the first successive displayed image and the second successive displayed image partially overlap;

the first successive displayed image has a first successive field of view and the second successive displayed image has a second successive field of view; and the first successive field of view and the second successive field of view partially overlap and when stitched together generate the successive field of view of the successive image.

5. The eyewear device of claim 1, wherein:

the eyewear device further includes a first visible light camera connected to the first image display to generate a first background scene of a first successive displayed image;

the eyewear device further includes a second visible light camera connected to the second image display to generate a second background scene of a second successive displayed image; and the first background scene and the second background scene partially overlap to present a three-dimensional observable area of the successive displayed image.

6. The eyewear device of claim 1, wherein:

the field of view adjustment renders visible a first three-dimensional graphical object which was not visible during the initial displayed image;

the first three-dimensional graphical object is overlaid on a background scene of the successive displayed image;

the field of view adjustment renders invisible a second three-dimensional graphical object which was visible during the initial displayed image; and the second three-dimensional graphical object is removed from the background scene of the successive displayed image.

7. The eyewear device of claim 6, wherein the first three-dimensional graphical object and the second three-dimensional graphical object include at least one of an animated character, a bitmoji, an application icon, weather information, or a picture.

8. The eyewear device of claim 1, wherein:

the eyewear device includes the head movement tracker;

the head movement tracker includes an inertial measurement unit; and the function of detecting movement of the user of the eyewear device includes tracking, via the head movement tracker, the head movement of the head of the user.

9. The eyewear device of claim 8, wherein the head movement includes a variation of head direction on a horizontal axis, a vertical axis, or a combination thereof from the initial head direction during presentation of the initial displayed image on the first and second image displays.

10. The eyewear device of claim 9, wherein the function of tracking, via the head movement tracker, the head movement of the head of the user further includes:

measuring, via the inertial measurement unit, the initial head direction on the horizontal axis, the vertical axis, or the combination thereof; and measuring, via the inertial measurement unit, the successive head direction on the horizontal axis, the vertical axis, or the combination thereof during presentation of the initial displayed image.

11. The eyewear device of claim 10, wherein the function of tracking, via the head movement tracker, the head movement of the head of the user further includes determining the variation of head direction based on both the initial head direction and the successive head direction.

12. The eyewear device of claim 11, wherein the function of detecting movement of the user of the eyewear device further includes:

in response to tracking, via the head movement tracker, the head movement of the head of the user, determining that the variation of head direction exceeds a deviation angle threshold on the horizontal axis, the vertical axis, or the combination thereof.

13. The eyewear device of claim 12, wherein the deviation angle threshold is between about 3° to 10°.

14. The eyewear device of claim 1, wherein execution of the programming by the processor further configures the eyewear device to perform further functions to:

after presenting, via the first and second image displays, the successive displayed image, detect fixation of the head of the user of the eyewear device by:

measuring, via the inertial measurement unit, an updated head direction on a horizontal axis, a vertical axis, or a combination thereof during presentation of the successive displayed image corresponding to an updated head direction; and determining the updated head direction is within a deviation angle threshold of the initial head direction on the horizontal axis, the vertical axis, or the combination thereof to indicate negligible head movement of the user thereby indicating fixation.

15. The eyewear device of claim 14, wherein execution of the programming by the processor further configures the eyewear device to perform further functions to in response to detecting fixation of the head of the user of the eyewear device, continuing to present, via the first and second image displays, the successive displayed image.

16. The eyewear device of claim 14, wherein:

the function of detecting fixation of the head of the user of the eyewear device further includes determining a time variation between an initial time occurring at time of measurement of the initial head direction and an updated time occurring at time of measurement of the updated head direction; and execution of the programming by the processor further configures the eyewear device to perform further functions to, in response to determining that the time variation exceeds a deviation time threshold thereby indicating the user of the eyewear device is idle, power down the eyewear device.

17. The eyewear device of claim 1, wherein:

the eyewear device includes the eye movement tracker;

the eye movement tracker includes:

an infrared emitter connected to the frame or the temple to emit a pattern of infrared light on the eye of the user; and an infrared camera connected to the frame or the temple to capture reflection variations in the emitted pattern of infrared light from the eye of the user; and the function of detecting movement of the user of the eyewear device includes tracking, via the eye movement tracker, the eye movement of the eye of the user based on the captured reflection variations.

18. The eyewear device of claim 17, wherein the eye movement includes a variation of eye direction on a horizontal axis, a vertical axis, or a combination thereof from the initial eye direction during presentation of the initial displayed image on the first and second image displays.

19. The eyewear device of claim 18, wherein execution of the programming by the processor further configures the eyewear device to perform further functions to prior to presenting, via the first and second image displays, the initial displayed image, calibrating the eye movement tracker by:

presenting, via the first and second image displays, a series of calibration images for viewing by the eye of the user, each of the calibration images having a respective point of interest at a respective known fixed position on the horizontal axis and the vertical axis; and in response to the eye of the user viewing the respective point of interest, recording, in an eye direction database, anatomical feature positions of the eye in relation to the respective known fixed position of the respective point of interest.

20. The eyewear device of claim 19, wherein the function of tracking, via the eye movement tracker, the eye movement of the eye of the user further includes:

initially emitting, via the infrared emitter, the pattern of infrared light on the eye of the user of the eyewear device;

capturing, via the infrared camera, initial reflection variations in the initially emitted pattern of infrared light on the eye of the user;

measuring, the initial eye direction on the horizontal axis, the vertical axis, or the combination thereof by comparing the initial reflection variations of the initially emitted pattern of infrared light on the eye of the user against the eye direction database; and successively emitting, via the infrared emitter, the pattern of infrared light on the eye of the user of the eyewear device;

capturing, via the infrared camera, successive reflection variations in the successively emitted pattern of infrared light on the eye of the user; and measuring, the successive eye direction on the horizontal axis, the vertical axis, or the combination thereof by comparing the successive reflection variations of the successively emitted pattern of infrared light on the eye of the user against the eye direction database.

21. The eyewear device of claim 20, wherein the function of tracking, via the eye movement tracker, the eye movement of the eye of the user further includes:

determining the variation of head direction based on both the initial eye direction and the successive eye direction.

* * * * *